(12) United States Patent  
Araki et al.

(10) Patent No.: US 8,361,563 B2
(45) Date of Patent: Jan. 29, 2013

(54) INK COMPOSITION AND INKJET RECORDING METHOD

(75) Inventors: Kenjiro Araki, Kanagawa (JP); Yasuhito Oshima, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 49 days.

(21) Appl. No.: 12/885,172

(22) Filed: Sep. 17, 2010

(65) Prior Publication Data

US 2011/0071239 A1    Mar. 24, 2011

(30) Foreign Application Priority Data

Sep. 18, 2009    (JP) ................................ 2009-216415
Jul. 30, 2010    (JP) ................................ 2010-172141

(51) Int. Cl.
*C08J 7/18*    (2006.01)
*C09D 11/02*    (2006.01)
(52) U.S. Cl. ..... 427/511; 427/466; 427/510; 106/31.78; 522/186; 524/100; 524/104
(58) Field of Classification Search .................. 524/100, 524/104
See application file for complete search history.

(56) References Cited

U.S. PATENT DOCUMENTS

| 2008/0075882 | A1 | 3/2008 | Hayata |
| 2010/0203262 | A1* | 8/2010 | Umebayashi ................ 427/595 |

FOREIGN PATENT DOCUMENTS

| EP | 1 829 680 A1 | 9/2007 |
| EP | 1 903 080 A1 | 3/2008 |
| EP | 1 958 788 A1 | 8/2008 |
| EP | 2 042 568 A1 | 4/2009 |
| JP | 2001-525479 A | 12/2001 |
| JP | 2004-2528 A | 1/2004 |
| JP | 2004-514014 A | 5/2004 |
| JP | 2006-299117 A | 11/2006 |
| JP | 2006-348206 A | 12/2006 |
| WO | 99/29787 A2 | 6/1999 |
| WO | 00/09332 A1 | 2/2000 |
| WO | 02/38688 A2 | 5/2002 |

OTHER PUBLICATIONS

Machine translation of JP 2006-348206 (Dec. 28, 2006).*
European Search Report dated Nov. 30, 2011.

* cited by examiner

*Primary Examiner* — Vu A Nguyen
(74) *Attorney, Agent, or Firm* — Sughrue Mion, PLLC

(57) ABSTRACT

An ink composition comprising:
(A) an isoindoline-based pigment;
(B) a pigment dispersing agent;
(C) a radically polymerizable compound; and
(D) a polymerization initiator;
the radically polymerizable compound (C) comprising at least one compound selected from the group consisting of compounds represented by Formula (I) to Formula (III):

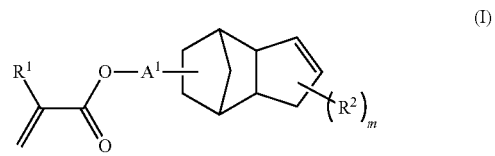

(I)

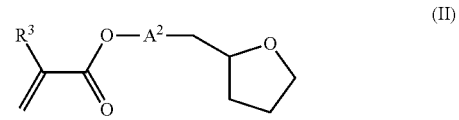

(II)

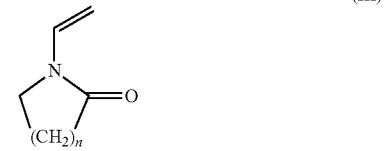

(III)

wherein
$R^1$ denotes a hydrogen atom or a methyl group,
$A^1$ denotes a single bond or a divalent linking group,
$R^2$ denotes a monovalent substituent,
m denotes an integer of 0 to 13, and when m is an integer of 2 to 13, the $R^2$s may be identical to or different from each other,
$R^3$ denotes a hydrogen atom or a methyl group,
$A^2$ denotes a single bond or a divalent linking group, and
n denotes an integer of 1 to 5.

12 Claims, No Drawings

INK COMPOSITION AND INKJET RECORDING METHOD

BACKGROUND OF THE INVENTION

1. Field of the Invention

The present invention relates to an ink composition suitably used for inkjet recording and an inkjet recording method.

2. Description of the Related Art

With regard to an image recording method for forming an image on a recording medium such as paper based on an image data signal, there are an electrophotographic system, sublimation type and melt type thermal transfer systems, an inkjet system, etc. In the electrophotographic system, a process of forming an electrostatic latent image on a photosensitive drum by electrically charging and exposing is required, and the system is complicated; as a result, there is the problem that the production cost is high. With regard to the thermal transfer system, although the equipment is inexpensive, due to the use of an ink ribbon there is the problem that the running cost is high and waste material is generated.

On the other hand, with regard to the inkjet system, the equipment is inexpensive and, since an image is formed directly on a recording medium by discharging an ink composition only on a required image area, the ink composition can be used efficiently and the running cost is low. Furthermore, there is little noise and it is excellent as an image recording system.

In recent years, a solvent-free type inkjet recording method in which drawing by inkjet is carried out using an ink composition that is curable by irradiation with radiation such as UV rays (radiation curing type ink composition) and the ink is then cured by irradiation with radiation such as UV rays has been attracting attention.

In general, compared with an aqueous ink containing water as a diluent or a solvent-based ink containing an organic solvent as a diluent, an inkjet recording method employing a radiation curing type ink makes it possible to draw on a non-absorbing recording medium such as a glass, metal, or plastic recording medium, and has merits such as a wide recording medium application range, excellent scratch resistance and solvent resistance of a drawn image, high sensitivity, excellent productivity and, because it does not contain a volatile solvent, a low burden on the environment.

The curing mechanism for radiation curing type inks can be roughly divided into the radical polymerization type and the cationic polymerization type, and since the radical polymerization type has merits such as excellent storage stability and low cost compared with the cationic polymerization type, it is widely used in the market.

Radical polymerization type ink compositions are described in, e.g., JP-PCT-2001-525479 (JP-PCT denotes a published Japanese translation of a PCT application), JP-PCT-2004-514014, and JP-A-2006-299117 (JP-A denotes a Japanese unexamined patent application publication). Since a printed material recorded by radiation-curing type inkjet as above is often used in industrial applications such as outdoor advertisements, high lightfastness and saturation are required.

On the other hand, with regard to a radiation-curing type ink for inkjet recording, an ink set is formed using yellow, magenta, cyan, and black as four basic colors, and since the yellow color has poor lightfastness compared with the other colors, development of a yellow ink having both high saturation and lightfastness is an important task.

In order to improve the problem of the yellow ink, JP-A-2004-2528 and JP-A-2006-348206 below have made proposals.

JP-A-2004-2528 discloses a UV-curing type inkjet recording ink composition comprising C.I. Pigment Yellow 180 as a yellow pigment, a polymeric dispersing agent having a basic adsorbing group, a photopolymerizable compound, and a photopolymerization initiator.

JP-A-2006-348206 discloses an actinic radiation-curing type inkjet ink comprising an isoindoline pigment, an isoindoline derivative containing a sulfonic acid or a salt thereof, a polymeric dispersing agent, and a monomer.

BRIEF SUMMARY OF THE INVENTION

C.I. Pigment Yellow 180 described in JP-A-2004-2528 has high saturation but is not adequate in terms of lightfastness. On the other hand, the isoindoline pigment described in JP-A-2006-348206 (for example, C.I. Pigment Yellow 139 or 185) has superior lightfastness and saturation but is difficult to finely disperse, and a further improvement has been desired in terms of storage stability and inkjet discharge properties.

It is an object of the present invention to provide an ink composition that can give an image having excellent scratch resistance, lightfastness, and saturation, that suppresses odor, and that has excellent storage stability and inkjet discharge properties, and an inkjet recording method employing the ink composition.

The above-mentioned object of the present invention has been attained by means described from <1> to <13> below.

<1> An ink composition comprising: (A) an isoindoline-based pigment; (B) a pigment dispersing agent; (C) a radically polymerizable compound; and (D) a polymerization initiator; the radically polymerizable compound (C) comprising at least one compound selected from the group consisting of compounds represented by Formula (I) to Formula (III):

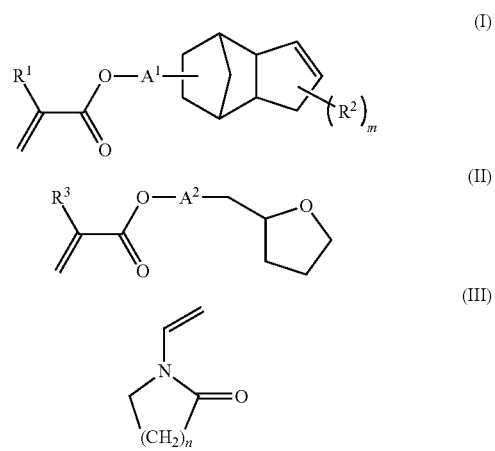

wherein $R^1$ denotes a hydrogen atom or a methyl group, $A^1$ denotes a single bond or a divalent linking group, $R^2$ denotes a monovalent substituent, m denotes an integer of 0 to 13, and when m is an integer of 2 to 13, the $R^2$s may be identical to or different from each other, $R^3$ denotes a hydrogen atom or a methyl group, $A^2$ denotes a single bond or a divalent linking group, and n denotes an integer of 1 to 5.

<2> The ink composition according to <1>, wherein the total content of compounds represented by Formula (I), Formula (II), and Formula (III) is at least 15 wt % but no greater than 85 wt % of the ink composition, <3> The ink composition according to <1> or <2> which comprises a compound represented by Formula (I), <4> The ink composition according to any one of <1> to <3> which comprises a compound represented by Formula (I) and at least one compound selected from the group consisting of compounds represented by Formula (II) and Formula (III), <5> The ink composition according to any one of <1> to <4>, wherein the isoindoline-based pigment (A) is C.I. Pigment Yellow 185, <6> The ink composition according to any one of <1> to <5>, wherein the pigment dispersing agent (B) comprises a sulfonic acid derivative of a disazo pigment, <7> The ink composition according to <6>, wherein the sulfonic acid derivative of a disazo pigment is a compound represented by Formula (1):

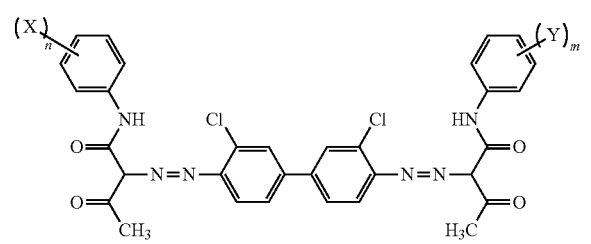

wherein X and Y independently denote a group represented by Formula (2) and m and n each satisfy 0.2<m+n<1.5 and denote a number of 0 or greater,

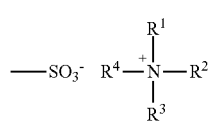

wherein $R^1$ to $R^4$ independently denote a hydrogen atom or an alkyl group having 1 to 30 carbon atoms, and at least one of $R^1$ to $R^4$ is an alkyl group having 1 to 30 carbon atoms, <8> The ink composition according to <6> or <7>, wherein the sulfonic acid derivative of a disazo pigment has a content of at least 0.1 wt % but no greater than 100 wt % relative to the total weight of the isoindoline-based pigment (A), <9> The ink composition according to any one of <1> to <8>, wherein the radically polymerizable compound (C) comprises a monofunctional (meth)acrylic acid ester having an aryl group having 6 to 20 carbon atoms, <10> The ink composition according to any one of <1> to <9>, wherein the radically polymerizable compound (C) comprises a 3- to 6-functional (meth)acrylic acid ester compound, <11> The ink composition according to any one of <1> to <10>, wherein the radically polymerizable compound (C) comprises a difunctional urethane (meth)acrylate oligomer, <12> The ink composition according to any one of <1> to <11>, wherein the polymerization initiator (D) comprises an acylphosphine compound, <13> An inkjet recording method comprising: ($a^1$) a step of discharging an ink composition onto a recording medium; and ($b^1$) a step of curing the ink composition by irradiating the discharged ink composition with actinic radiation, the ink composition being the ink composition according to any one of <1> to <12>.

DETAILED DESCRIPTION OF THE INVENTION (1) Ink Composition

The ink composition of the present invention (hereinafter, also simply called an 'ink') (A) an isoindoline-based pigment; (B) a pigment dispersing agent; (C) a radically polymerizable compound; and (D) a polymerization initiator; the radically polymerizable compound (C) comprising at least one compound selected from the group consisting of compounds represented by Formula (I) to Formula (III),

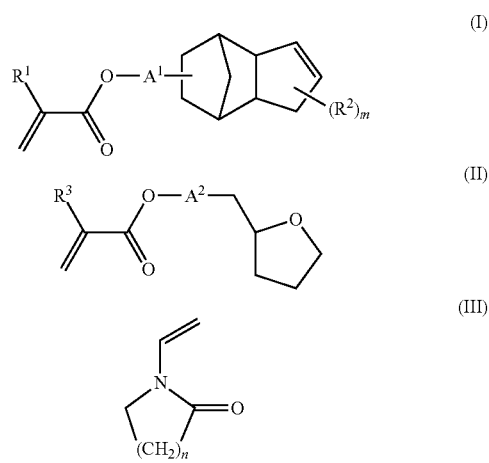

wherein
$R^1$ denotes a hydrogen atom or a methyl group,
$A^1$ denotes a single bond or a divalent linking group,
$R^2$ denotes a monovalent substituent,
m denotes an integer of 0 to 13, and when m is an integer of 2 to 13, the $R^2$s may be identical to or different from each other,
$R^3$ denotes a hydrogen atom or a methyl group,
$A^2$ denotes a single bond or a divalent linking group, and
n denotes an integer of 1 to 5.

The ink composition of the present invention is suitably used as the inkjet recording ink composition. Furthermore, the ink composition of the present invention preferably exhibits a yellow color; in other words, the ink composition of the present invention is preferably a yellow ink composition. In the present invention, the description 'A to B' expressing a range of numerical values means 'not less than A but not more than B'. That is, it expresses a range of numerical values that includes the endpoints A and B. In some of the compound examples in the present invention, the hydrocarbon chain is described by a simplified structural formula in which symbols for carbon (C) and hydrogen (H) are omitted.

The present invention is described in detail below.

The ink composition of the present invention is an ink composition that can cure upon exposure to radiation and is also an oil-based ink composition.

The 'radiation' referred to in the present invention is not particularly limited as long as it is actinic radiation that can provide energy that enables an initiating species to be generated in the ink composition when irradiated, and broadly includes α rays, γ rays, X rays, ultraviolet rays (UV), visible light, and an electron beam; among these, ultraviolet rays and an electron beam are preferable from the viewpoint of curing sensitivity and the availability of equipment, and ultraviolet rays are particularly preferable. The ink composition of the present invention is therefore preferably an ink composition that can cure upon exposure to ultraviolet rays as radiation.

(A) Isoindoline-Based Pigment

The ink composition of the present invention comprises (A) an isoindoline-based pigment.

The isoindoline-based pigment that can be used in the present invention is not particularly limited as long as it is a pigment having an isoindoline structure, but is preferably an isoindoline-based yellow pigment.

Examples of the isoindoline-based yellow pigment include C.I. Pigment Yellow 139 and C.I. Pigment Yellow 185.

Among them, it is preferable to use C.I. Pigment Yellow 185, for which the effects of the present invention are markedly exhibited.

For dispersion of the isoindoline-based pigment, for example, dispersing equipment such as a ball mill, a sand mill, an attritor, a roll mill, a jet mill, a homogenizer, a paint shaker, a kneader, an agitator, a Henschel mixer, a colloidal mill, an ultrasonic homogenizer, a pearl mill, a wet type jet mill, or a bead mill may suitably be used. Among them, it is preferable to use a media dispersing machine using balls and beads, etc. and more preferable to use a bead mill dispersing machine.

When carrying out dispersion by means of a bead mill, the use of beads preferably having an average diameter of 0.01 to 3.0 mm, more preferably 0.05 to 1.5 mm, and yet more preferably 0.1 to 1.0 mm enables a pigment dispersion having excellent stability to be obtained.

A dispersion medium used when dispersing the above-mentioned isoindoline-based pigment in the ink composition is not particularly limited, and it may be selected appropriately according to the intended application; for example, a low molecular weight actinic radiation-curable compound may be used as the dispersion medium, or a solvent may be used as the dispersion medium. However, the ink composition of the present invention is a radiation-curing ink composition, and since the ink composition is cured after being applied onto a recording medium, it is preferable that it does not contain a solvent and is solvent-free. This is because, if solvent remains in a cured ink image, the solvent resistance is degraded, and the VOC (Volatile Organic Compound) problem of residual solvent occurs. Because of this, from the viewpoint of dispersion suitability and improvement of ease of handling of the ink composition it is preferable that an actinic radiation-curable compound is used as the dispersion medium, and a polymerizable compound having the lowest viscosity is selected therefrom.

The volune-average particle size of the isoindoline-based pigment is not particularly limited and may be selected appropriately according to the intended application, but since the finer it is the better coloring properties, it is preferably 0.01 to 0.4 μm, and more preferably 0.02 to 0.2 μm. The maximum particle size of the isoindoline-based pigment is preferably no greater than 3 μm, and more preferably no greater than 1 μm. The particle size of the isoindoline-based pigment may be adjusted by selection of the isoindoline-based pigment, dispersing agent, and dispersion medium and setting of dispersion conditions and filtration conditions; head nozzle clogging can be suppressed by controlling the particle size of the organic pigment, and it is thus possible to maintain the storage stability of an ink composition, and the transparency and curing sensitivity of an ink composition.

The particle size of the isoindoline-based pigment in the ink composition may be measured by a known measurement method. Specifically, it may be measured by a centrifugal sedimentation light transmission method, an X-ray transmission method, a laser diffraction/scattering method, or a dynamic light scattering method.

From the viewpoint of sufficient saturation being obtained, the viscosity being in a range suitable for inkjet discharge, etc., the isoindoline-based pigment is preferably at least 0.3 wt % but no greater than 20 wt % relative to the total weight of the ink composition, more preferably at least 0.5 wt % but no greater than 15 wt %, and particularly preferably at least 1 wt % but no greater than 10 wt %.

(B) Pigment Dispersing Agent

The ink composition of the present invention comprises (B) a pigment dispersing agent.

The dispersing agent that can be used in the present invention is preferably (B-1) a polymeric dispersing agent. Furthermore, it is preferable to use (B-2) a sulfonic acid derivative of a disazo pigment in combination with the polymeric dispersing agent (B-1) or on its own.

(B-1) Polymeric Dispersing Agent

The 'polymeric dispersing agent' referred to in the present invention means a dispersing agent having a weight-average molecular weight of 1,000 or greater.

The weight-average molecular weight Mw of the polymeric dispersing agent is preferably in the range of 2,000 to 300,000, more preferably 3,000 to 200,000, yet more preferably 4,000 to 100,000, and particularly preferably 5,000 to 100,000. When the weight-average molecular weight of the polymeric dispersing agent is in the above-mentioned range, the dispersibility of the pigment improves, and the storage stability and dischargeability of the ink composition are good.

The main chain skeleton of the polymeric dispersing agent is not particularly limited; examples thereof include a polyurethane skeleton, a polyacrylic skeleton, a polyester skeleton, a polyamide skeleton, a polyimide skeleton, and a polyurea skeleton, and from the viewpoint of storage stability of the ink composition a polyurethane skeleton, a polyacrylic skeleton, and a polyester skeleton are preferable. The structure of the polymeric dispersing agent is not particularly limited either; examples thereof include a random structure, a block structure, a comb structure, and a star structure, and similarly from the viewpoint of storage stability a block structure or a comb structure is preferable.

Examples of the polymeric dispersing agent include commercial wetting dispersing agents DISPER BYK series 101, 102, 103, 106, 108, 109, 110, 111, 112, 116, 130, 140, 142, 145, 161, 162, 163, 164, 166, 167, 168, 170, 171, 174, 180, 182, 183, 184, 185, 2000, 2001, 2020, 2050, 2070, 2096, and 2150 sold by BYK-Chemie GmbH; EFKA series 4008, 4009, 4010, 4015, 4020, 4046, 4047, 4050, 4055, 4060, 4080, 4300, 4330, 4340, 4400, 4401, 4402, 4403, 4406, 4800, 5010, 5044, 5054, 5055, 5063, 5064, 5065, 5066, 5070, and 5244 sold by Ciba Specialty Chemicals Inc.; Solsperse series 3000, 11200, 13240, 13650, 13940, 16000, 17000, 18000, 20000, 21000, 24000SC, 24000GR, 26000, 28000, 31845, 32000, 32500, 32550, 32600, 33000, 34750, 35100, 35200, 36000, 36600, 37500, 38500, 39000, 53095, 54000, 55000, 56000, and 71000 sold by Lubrizol Corp.; DISPARLON series 1210, 1220, 1831, 1850, 1860, 2100, 2150, 2200, 7004, KS-260, KS-273N, KS-860, KS-873N, PW-36, DN-900, DA-234, DA-325, DA-375, DA-550, DA-1200, DA-1401, and DA-7301 sold by Kusumoto Chemicals Ltd., AJISPER PB series PB-711, PB-821, PB-822, PN-411, and PA-111 sold by Ajinomoto Fine-Techno Co.; Surfynol series 104A, 104C, 104E, 104H, 104S, 104BC, 104DPM, 104PA, 104PG-50, 420, 440, DF110D, DF110L, DF37, DF58, DF75, DF210, CT111, CT121, CT131, CT136, GA, TG, and TGE sold by Air Products and Chemicals. Inc.; Olfine series STG, and E1004 sold by Nissin Chemical Industry Co., Ltd.; SN Sperse series 70, 2120, and 2190 sold by San Nopco Ltd.; ADEKA COL and ADEKA TOL series sold by Adeka Corp.; SANNONIC series, NAROACTY CL series, EMULMIN series, NEWPOL PE series, IONET M series, IONET D series, IONET S series, IONET T series, and SANSEPARER 100 sold by Sanyo Chemical Industries, Ltd.

With regard to the polymeric dispersing agent, the concentration thereof added to a pigment dispersion is not particularly limited, and it is preferably determined while taking into consideration the chemical structure of a dispersing agent used and the pigment concentration.

From the viewpoint of the dispersibility of the pigment and the concentration of free dispersing agent being decreased, the content of the polymeric dispersing agent in the ink composition of the present invention is preferably at least 1 wt % but no greater than 50 wt % relative to the total weight of the isoindoline-based pigment in the ink composition, more preferably at least 2 wt % but no greater than 30 wt %, and particularly preferably at least 5 wt % but no greater than 20 wt %.

When carrying out dispersion, it is also preferable to add, in addition to a dispersing agent, a dispersion adjuvant, which is generally called a synergist (e.g. 5000, 12000, and 22000 of the SOLSPERSE series commercially available from the Lubrizol Corporation, EFKA6745 commercially available from Ciba Specialty Chemicals, etc.), various types of surfactants, or an antifoaming agent, thus improving the dispersibility and wettability of the pigment.

(B-2) Sulfonic Acid Derivative of Disazo Pigment

In the present invention, as the pigment dispersing agent, the sulfonic acid derivative of a disazo pigment (B-2) is desirably contained in combination with the polymeric dispersing agent (B-1) or on its own, and it is preferable to use the sulfonic acid derivative of a disazo pigment (B-2) in combination with the polymeric dispersing agent (B-1).

As the sulfonic acid derivative of a disazo pigment (B-2), an alkylammonium salt of a sulfonated derivative of a disazo-based yellow colorant is preferable.

With regard to the alkylammonium salt of a sulfonated derivative of a disazo-based yellow colorant, one type thereof may be contained on its own or two or more types thereof may be contained.

Examples of the disazo-based yellow colorant in the alkylammonium salt of a sulfonated derivative of a disazo-based yellow colorant include C.I. Pigment Yellow 12, 13, 14, 16, 17, 55, 63, 77, 81, 83, 106, 124, 126, 127, 152, 155, 170, 172, 174, 176, 214, and 219.

The substitution position of the sulfonate group ($-SO_3^-$) in the alkylammonium salt of a sulfonated derivative of a disazo-based yellow colorant is not particularly limited; it may be any position, but is preferably on an aromatic ring. That is, the alkylammonium salt of a sulfonated derivative of a disazo-based yellow colorant is preferably a compound having a sulfonate group on an aromatic ring.

It is preferable for the four groups on the nitrogen atom of the ammonium group of the alkylammonium salt of a sulfonated derivative of a disazo-based yellow colorant to be independently a hydrogen atom or an alkyl group having 1 to 30 carbon atoms, and they are more preferably an alkyl group having 1 to 30 carbon atoms. In addition, at least one of the four groups on the nitrogen atom is an alkyl group, and at least one of the four groups on the nitrogen atom is preferably an alkyl group having 1 to 30 carbon atoms.

Furthermore, two or more of the four groups on the nitrogen atom may be bonded to form a ring structure.

Moreover, when the alkylammonium salt of a sulfonated derivative of a disazo-based yellow colorant has two or more ammonium groups, they may be identical to or different from each other.

The ammonium group of the alkylammonium salt of a sulfonated derivative of a disazo-based yellow colorant is preferably a tetraalkylammonium group, and is more preferably a tetraalkylammonium group having two alkyl groups having 10 to 30 carbon atoms and two alkyl groups having 1 to 3 carbon atoms.

The alkylammonium salt of a sulfonated derivative of a disazo-based yellow colorant is preferably an alkylammonium salt of a sulfonated derivative of C.I. Pigment Yellow 12, and more preferably a compound represented by Formula (1).

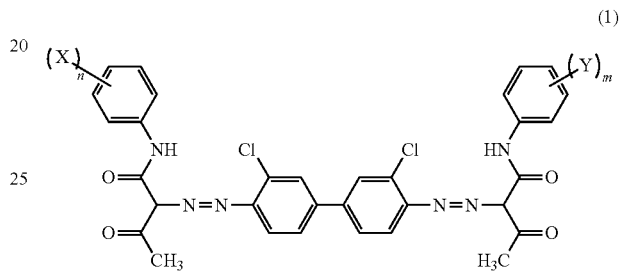

wherein
X and Y independently denote a group represented by Formula (2), and
m and n each satisfy $0.2<m+n<1.5$ and denote a number of 0 or greater.

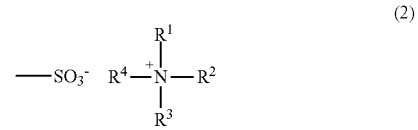

wherein
$R^1$ to $R^4$ independently denote a hydrogen atom or an alkyl group having 1 to 30 carbon atoms, and at least one of $R^1$ to $R^4$ is an alkyl group having 1 to 30 carbon atoms.

m and n in Formula (1) each satisfy $0.2<m+n<1.5$ and denote a number of 0 or greater. Furthermore, m and n are each preferably positive numbers.

X and Y in Formula (1) independently denote a group represented by Formula (2).

$R^1$ to $R^4$ in Formula (2) independently denote a hydrogen atom or an alkyl group having 1 to 30 carbon atoms, and at least one of $R^1$ to $R^4$ is an alkyl group having 1 to 30 carbon atoms.

Furthermore, in Formula (2), it is preferable for $R^1$ to $R^4$ to be independently an alkyl group having 1 to 30 carbon atoms, and it is more preferable for $R^1$ and $R^2$ to be independently an alkyl group having 10 to 30 carbon atoms and for $R^3$ and $R^4$ to be independently an alkyl group having 1 to 3 carbon atoms.

Moreover, m+n, which is the sum of m and n, is preferably $0.2<m+n<1.5$, more preferably $0.5<m+n<1.4$, and yet more preferably $0.7<m+n<1.2$. In addition, a case in which m+n=0.5 means a case in which there is a mixture of a disazo-based yellow colorant and a sulfonated derivative of a disazo-based yellow colorant (including a monosulfonated derivative, a disulfonated derivative, etc.), and the amount of ammoniated sulfo groups of the disazo-based yellow colorant is 0.5 on average.

The ink composition of the present invention preferably comprises (b-1) a monoalkylammonium salt of a monosulfonated derivative of a disazo-based yellow colorant, (b-2) a monoalkylammonium salt of a monosulfonated derivative of a disazo-based yellow colorant and a dialkylammonium salt to the total amount of the disazo-based yellow colorant and the alkylammonium salt of a sulfonated derivative of a disazo-based yellow colorant in the ink composition, more preferably more than 0.2 but less than 1.5 on average, yet more preferably more than 0.5 but less than 1.4 on average, and particularly preferably more than 0.7 but less than 1.2 on average.

Specific examples of alkylammonium salts of sulfonated derivatives of C.I. Pigment Yellow 12 include the compounds listed below.

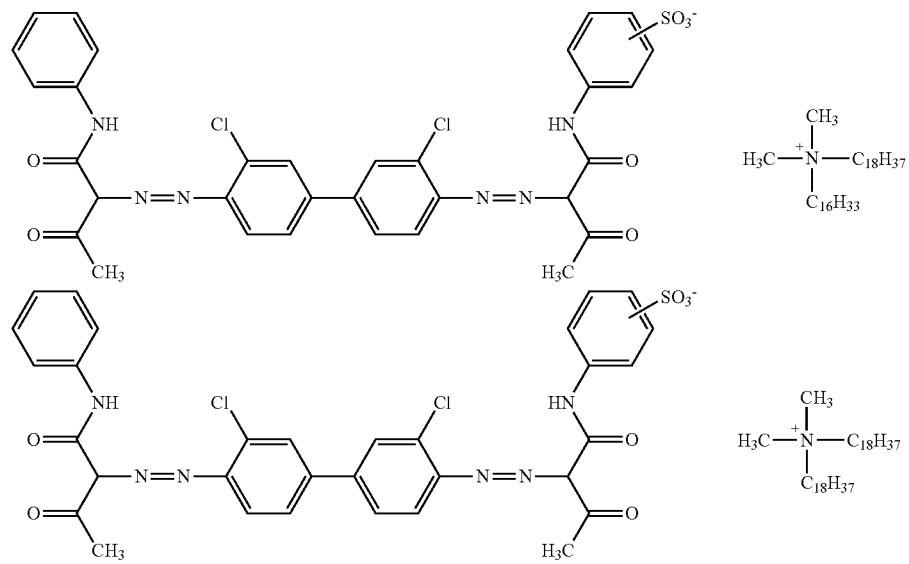

of a disulfonated derivative of a disazo-based yellow colorant, (b-3) a disazo-based yellow colorant and a monoalkylammonium salt of a monosulfonated derivative of a disazo-based yellow colorant, (b-4) a disazo-based yellow colorant, a monoalkylammonium salt of a monosulfonated derivative of a disazo-based yellow colorant, and a dialkylammonium salt of a disulfonated derivative of a disazo-based yellow colorant, or (b-5) a disazo-based yellow colorant and a dialkylammonium salt of a disulfonated derivative of a disazo-based yellow colorant, and more preferably comprises (b-1) a monoalkylammonium salt of a monosulfonated derivative of a disazo-based yellow colorant, (b-2) a monoalkylammonium salt of a monosulfonated derivative of a disazo-based yellow colorant and a dialkylammonium salt of a disulfonated derivative of a disazo-based yellow colorant, (b-3) a disazo-based yellow colorant and a monoalkylammonium salt of a monosulfonated derivative of a disazo-based yellow colorant, or (b-4) a disazo-based yellow colorant, a monoalkylammonium salt of a monosulfonated derivative of a disazo-based yellow colorant, and a dialkylammonium salt of a disulfonated derivative of a disazo-based yellow colorant.

Furthermore, the disazo-based yellow colorant, the monoalkylammonium salt of a monosulfonated derivative of a disazo-based yellow colorant, and the dialkylammonium salt of a disulfonated derivative of a disazo-based yellow colorant that can be contained in the ink composition are preferably a disazo-based yellow colorant and an alkylammonium salt of a sulfonated derivative of a disazo-based yellow colorant of the same type.

Moreover, the amount of $-SO_3^-$ of the alkylammonium salt of a sulfonated derivative of a disazo-based yellow colorant is preferably 0.2 to 2.0 on average per molecule relative The content of the alkylammonium salt of a sulfonated derivative of a disazo-based yellow colorant in the ink composition of the present invention is preferably at least 0.1 wt % but no greater than 100 wt % relative to the total weight of the isoindoline-based pigment in the ink composition, more preferably at least 0.5 wt % but no greater than 80 wt %, and particularly preferably at least 2 wt % but no greater than 50 wt %.

(C) Radically Polymerizable Compound

The ink composition of the present invention comprises (C) a radically polymerizable compound; and the radically polymerizable compound (C) comprises at least one compound selected from the group consisting of compounds represented by Formula (I) to Formula (III),

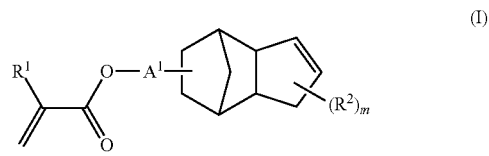

(I)

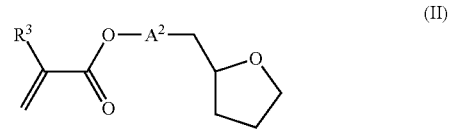

(II)

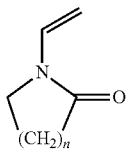

wherein
R$^1$ denotes a hydrogen atom or a methyl group,
A$^1$ denotes a single bond or a divalent linking group,
R$^2$ denotes a monovalent substituent,
m denotes an integer of 0 to 13, and when m is an integer of 2 to 13, the R$^2$s may be identical to or different from each other,
R$^3$ denotes a hydrogen atom or a methyl group,
A$^2$ denotes a single bond or a divalent linking group, and
n denotes an integer of 1 to 5.

Furthermore, the ink composition of the present invention may comprise a radically polymerizable compound other than compounds represented by Formula (I), Formula (II), and Formula (III), and preferably comprises at least one type of (meth)acrylic acid ester compound other than a compound represented by Formula (I), Formula (II) or Formula (III).

A Compound Represented by Formula (I)

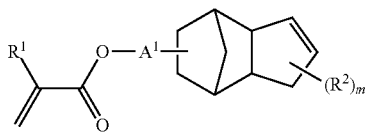

wherein
R$^1$ denotes a hydrogen atom or a methyl group,
A$^1$ denotes a single bond or a divalent linking group,
R$^2$ denotes a monovalent substituent,
m denotes an integer of 0 to 13, and when m is an integer of 2 to 13, the R$^2$s may be identical to or different from each other.

R$^1$ in Formula (I) denotes a hydrogen atom or a methyl group, and in terms of cure rate is preferably a hydrogen atom.

A$^1$ in Formula (I) independently denotes a single bond or a divalent linking group.

The divalent linking group is preferably —R$^6$—, —R$^6$—O—, —R$^6$—CO—, —R$^6$—COO—, —R$^6$—CONR$^7$—, —R$^6$—NR$^7$—, —R$^6$—NR$^7$CO—, —R$^6$—NR$^7$COO—, —R$^6$—NR$^7$CONR$^8$—, or a group formed by combining these groups. In addition, when it is a group formed by combining these groups, R$^6$ to R$^8$ in the combined divalent linking group may be identical to or different from each other.

R$^6$ denotes a divalent hydrocarbon group having 1 to 20 carbon atoms.

Examples of the divalent hydrocarbon group having 1 to 20 carbon atoms include a hydrocarbon group that is formed by removing two hydrogen atoms from a hydrocarbon described below, which may have a monovalent substituent, described later.

Examples of the hydrocarbon include an aliphatic hydrocarbon and an aromatic hydrocarbon.

Preferred examples of the aliphatic hydrocarbon include aliphatic hydrocarbons having 1 to 40 carbon atoms such as methane, ethane, propane, butane, pentane, hexane, heptane, octane, nonane, decane, dodecane, octadecane, cyclopropane, cyclobutane, cyclopentane, cyclohexane, bicyclo[3.2.1]octane, spiro[4.5]decane, adamantane, bornane, norbornane, cis- or trans-hydrindane, cis- or trans-decahydronaphthalene, exo- or endo-tricyclo[5.2.1.0$^{2,6}$] decane, ethylene, propylene, 1-butene, 1-hexene, 1-heptadecene, 2-butene, 2-hexene, 4-nonene, 7-tetradecene, butadiene, piperylene, 1,9-decadiene, cyclopentene, cyclohexene, cyclooctene, 1,4-cyclohexadiene, 1,5-cyclooctadiene, 1,5,9-cyclododecatriene, 2-bornene, 2-norbornene, exo- or endo-tricyclo[5.2.1.0$^{2,6}$]dec-3-ene, octahydronaphthalene, tricyclo[6.2.1.0$^{2,7}$]undec-4-ene, tetracyclo[6.2.1.1$^{3,6}$.0$^{2,7}$]dodec-4-ene, bicyclo[2.2.1]hepta-2,5-diene, 3a,4,7,7a-tetrahydroindene, acetylene, 1-propyne, and 2-hexyne.

Preferred examples of the aromatic hydrocarbon include aromatic hydrocarbons such as benzene, naphthalene, anthracene, phenanthrene, pyrene, acenaphthylene, triphenylene, indene, fluorene, and 1,2,3,4-tetrahydronaphthalene.

Furthermore, the divalent hydrocarbon group having 1 to 20 carbon atoms denoted by R$^6$ may be a hydrocarbon group formed by removing two hydrogen atoms from a hydrocarbon formed by combining two or more types of the above hydrocarbons (e.g. a 4,4'-biphenylene group) (in this case, the total number of carbon atoms after combination is 1 to 20).

Moreover, carbon atoms forming such a hydrocarbon group may be replaced by one or more heteroatoms selected from an oxygen atom, a nitrogen atom, and a sulfur atom.

The divalent linking group is, in terms of flexibility, preferably —R$^6$—O—, —R$^6$—COO—, —R$^6$—NR$^7$COO—, or a group formed by combining these groups, and more preferably —R$^6$—O— in which R$^6$ is a straight-chain or branched alkylene group having 1 to 5 carbon atoms, or a group formed by combining two or more —R$^6$—O—.

R$^7$ and R$^8$ independently denote a hydrogen atom or a monovalent hydrocarbon group having 1 to 20 carbon atoms.

Examples of the monovalent hydrocarbon group having 1 to 20 carbon atoms include a hydrocarbon group formed by removing one hydrogen atom from the above-mentioned hydrocarbons. Furthermore, the monovalent hydrocarbon group having 1 to 20 carbon atoms may have a monovalent substituent, which is described later.

A monovalent substituent that may be possessed by R$^6$ to R$^8$ has the same meaning as that of a monovalent substituent in R$^2$ and R$^4$, which is described later, and a preferred range is also the same.

R$^2$ in Formula (I) denotes a monovalent substituent. When the substitution number m of R$^2$ is an integer of 2 to 13, the two or more R$^2$s may be identical to or different from each other.

Examples of the monovalent substituent in R$^2$ include a halogen atom (—F, —Br, —Cl, —I), a hydroxy group, an alkoxy group, an aryloxy group, a mercapto group, an alkylthio group, an arylthio group, an alkyldithio group, an aryldithio group, an amino group, an N-alkylamino group, an N,N-dialkylamino group, an N-arylamino group, an N,N-diarylamino group, an N-alkyl-N-arylamino group, an acyloxy group, a carbamoyloxy group, an N-alkylcarbamoyloxy group, an N-arylcarbamoyloxy group, an N,N-dialkylcarbamoyloxy group, an N,N-diarylcarbamoyloxy group, an N-alkyl-N-arylcarbamoyloxy group, an alkylsulfoxy group, an arylsulfoxy group, an acylthio group, an acylamino group, an N-alkylacylamino group, an N-arylacylamino group, a ureido group, an N'-alkylureido group, an N',N'-dialkylureido group, an N'-arylureido group, an N',N'-diarylureido group, an N'-alkyl-N'-arylureido group, an N-alkylureido group, an N-arylureido group, an N'-alkyl-N-alkylureido group, an N'-alkyl-N-arylureido group, an N',N'-dialkyl-N-alkylureido group, an N',N'-dialkyl-N-arylureido group, an N'-aryl-N- alkylureido group, an N'-aryl-N-arylureido group, an N',N'-diaryl-N-alkylureido group, an N',N'-diaryl-N-arylureido group, an N'-alkyl-N'-aryl-N-alkylureido group, an N'-alkyl-N'-aryl-N-arylureido group, an alkoxycarbonylamino group, an aryloxycarbonylamino group, an N-alkyl-N-alkoxycarbonylamino group, an N-alkyl-N-aryloxycarbonylamino group, an N-aryl-N-alkoxycarbonylamino group, an N-aryl-N-aryloxycarbonylamino group, a formyl group, an acyl group, a carboxy group and its conjugate base group, an alkoxycarbonyl group, an aryloxycarbonyl group, a carbamoyl group, an N-alkylcarbamoyl group, an N,N-dialkylcarbamoyl group, an N-arylcarbamoyl group, an N,N-diarylcarbamoyl group, an N-alkyl-N-arylcarbamoyl group, an alkylsulfinyl group, an arylsulfinyl group, an alkylsulfonyl group, an arylsulfonyl group, a sulfo group (—SO$_3$H) and its conjugate base group, an alkoxysulfonyl group, an aryloxysulfonyl group, a sulfinamoyl group, an N-alkylsulfinamoyl group, an N,N-dialkylsulfinamoyl group, an N-arylsulfinamoyl group, an N,N-diarylsulfinamoyl group, an N-alkyl-N-arylsulfinamoyl group, a sulfamoyl group, an N-alkylsulfamoyl group, an N,N-dialkylsulfamoyl group, an N-arylsulfamoyl group, an N,N-diarylsulfamoyl group, an N-alkyl-N-arylsulfamoyl group, N-acylsulfamoyl group and its conjugate base group, N-alkylsulfonylsulfamoyl group (—SO$_2$NHSO$_2$(alkyl)) and its conjugated base group, N-arylsulfonylsulfamoyl group (—SO$_2$NHSO$_2$(aryl)) and its conjugated base group, N-alkylsulfonylcarbamoyl group (—CONHSO$_2$(alkyl)) and its conjugated base group, N-arylsulfonylcarbamoyl group (—CONHSO$_2$(aryl)) and its conjugated base group, an alkoxysilyl group (—Si(O-alkyl)$_3$), an aryloxysilyl group (—Si(O-aryl)$_3$), a hydroxysilyl group (—Si(OH)$_3$) and its conjugate base group, a phosphono group (—PO$_3$H$_2$) and its conjugate base group, a dialkylphosphono group (—PO(O-alkyl)$_2$), a diarylphosphono group (—PO(O-aryl)$_2$), an alkylarylphosphono group (—PO(O-alkyl)(O-aryl)), a monoalkylphosphono group (—PO(O-alkyl)OH) and its conjugate base group, a monoarylphosphono group (—PO(O-aryl)OH) and its conjugate base group, a phosphonooxy group (—OPO$_3$H$_2$) and its conjugate base group, a dialkylphosphonooxy group (—OPO(O-alkyl)$_2$), a diarylphosphonooxy group (—OPO(O-aryl)$_2$), an alkylarylphosphonooxy group (—OPO(O-alkyl)(O-aryl)), a monoalkylphosphonooxy group (—OPO(O-alkyl)OH) and its conjugate base group, a monoarylphosphonooxy group (—OPO(O-aryl)OH) and its conjugate base group, a cyano group, and a nitro group, a dialkyl boryl group (—B(alkyl)$_2$), a diaryl boryl group (—B(aryl)$_2$), an alkyl aryl boryl group (—B(alkyl)(aryl)), a dihydroxy boryl group (—B(OH)$_2$) and its conjugate base group, an alkyl hydroxy boryl group (—B(alkyl)(OH)) and its conjugate base group, an aryl hydroxy boryl group (—B(aryl)(OH)) and its conjugate base group, an aryl group, an alkyl group, an alkenyl group and an alkynyl group.

When these monovalent substituents contain a carbon atom, the number of carbon atoms therein is preferably 1 to 20, more preferably 1 to 10, and particularly preferably 1 to 5.

In terms of cure rate and discharge stability, it is preferable for the compound represented by Formula (I) not to have a monovalent substituent denoted by $R^2$ or for the monovalent substituent to be a halogen atom or an alkoxy group, aryloxy group, alkyl group, alkenyl group, or aryl group having 1 to 40 carbon atoms.

The substitution number m of $R^2$ in Formula (I) denotes an integer of 0 to 13, and is preferably 0 to 8, more preferably 0 to 2, and particularly preferably 0, that is, there is no $R^2$ in Formula (I).

$A^1$ and $R^2$ in Formula (I) may be linked at any position of the tricyclo[5.2.1.0$^{2,6}$]dec-3-ene structure shown below (also called a 'dicyclopentenyl structure').

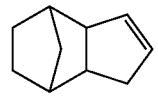

Tricyclo[5.2.1.0$^{2,6}$]dec-3-ene

Tricyclo[5.2.1.0$^{2,6}$]dec-3-ene

With regard to compounds represented by Formula (I), one type thereof may be used on its own or two or more types thereof may be used in combination.

The ink composition of the present invention preferably comprises, in terms of inkjet discharge properties, at least the compound represented by Formula (I).

Specific examples of the compound represented by Formula (I) include the compounds shown below, but the present invention is not limited thereto.

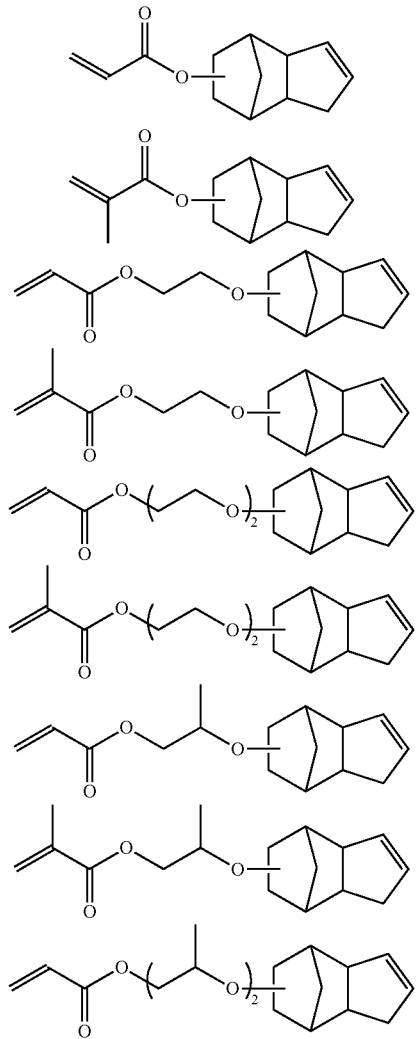

-continued

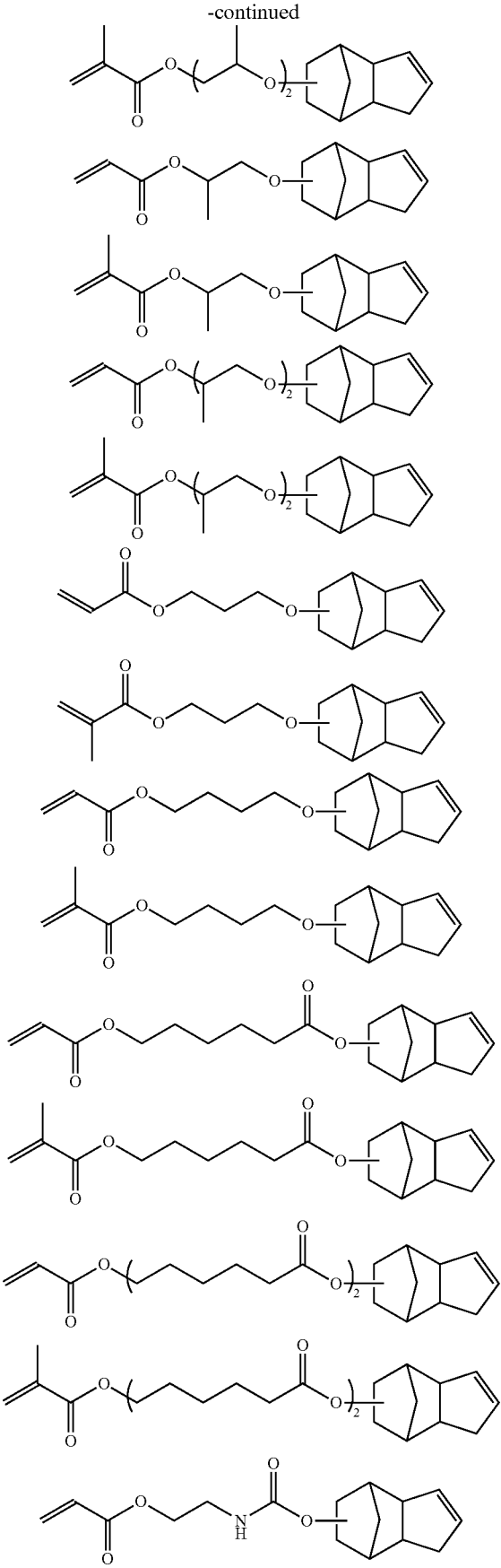

-continued

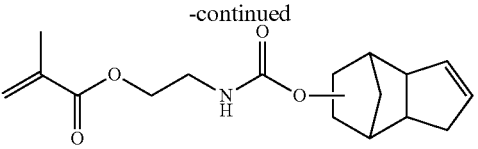

The compound represented by Formula (I) is available as, for example, Fancryl FA-511A, Fancryl FA-512A, Fancryl FA-512AS, Fancryl FA-512M (all from Hitachi Chemical Co., Ltd.), etc.

The total content of compounds represented by Formula (I) in the ink composition of the present invention is preferably in the range of 1 to 60 wt % relative to the weight of the entire ink composition, more preferably in the range of 10 to 40 wt %, and yet more preferably in the range of 15 to 35 wt %. When the total content is 1 wt % or greater the cure rate and scratch resistance are excellent, and when the total content is no greater than 60 wt % the inkjet discharge properties are excellent.

A Compound Represented by Formula (II)

$$\underset{R^3}{\overset{}{\underset{\|}{\text{C}}}}\text{—}\overset{O}{\underset{\|}{\text{C}}}\text{—}O\text{—}A^2\text{—}\boxed{\text{THF}} \quad (II)$$

wherein $R^3$ denotes a hydrogen atom or a methyl group, and $A^2$ denotes a single bond or a divalent linking group.

$R^3$ in Formula (II) denotes a hydrogen atom or a methyl group, and in terms of cure rate is preferably a hydrogen atom.

$A^2$ in Formula (II) denotes a single bond or a divalent linking group.

A preferred structure for $A^2$ is the same as that for $A^1$ in Formula (I).

From the viewpoint of cure rate of the ink composition and adhesion to a substrate, $A^2$ is preferably a single bond. Furthermore, from the viewpoint of flexibility, $A^2$ is preferably —$R^6$—O—, —$R^6$—COO—, —$R^6$—NR$^7$COO—, or a group formed by combining these groups, and more preferably —$R^6$—O— or —$R^6$—COO— in which $R^6$ is a straight-chain or branched alkyl group having 1 to 5 carbon atoms, or a group formed by combining two or more of these.

Specific examples of the compound represented by Formula (II) include the compounds shown below, but the present invention is not limited thereto.

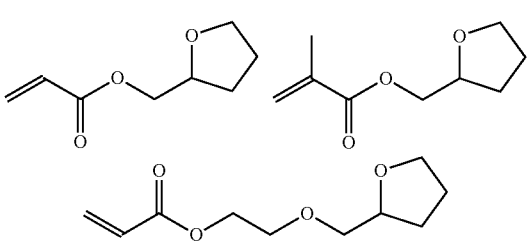

-continued

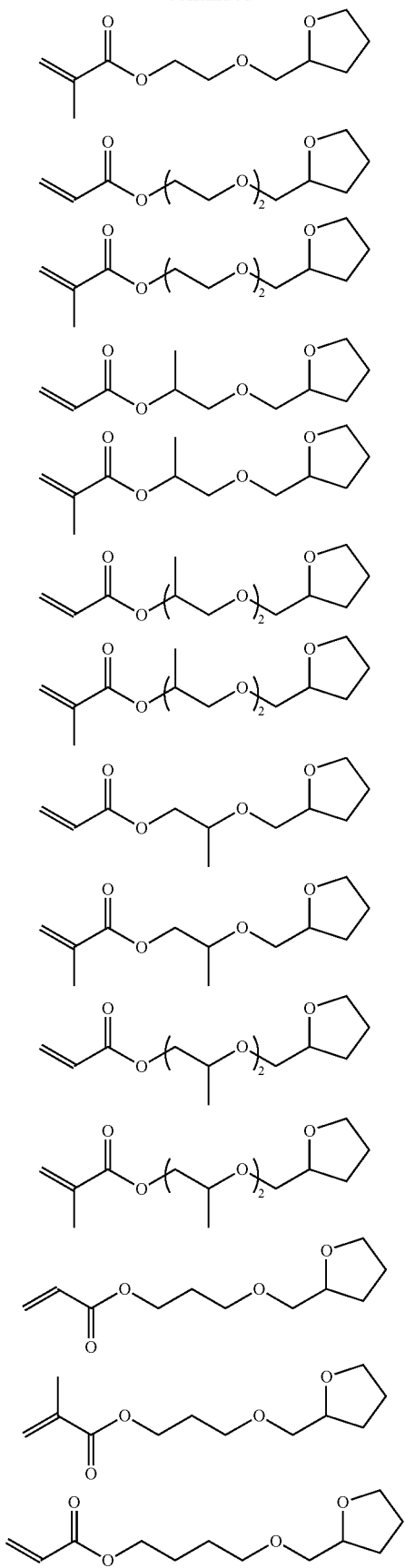

-continued

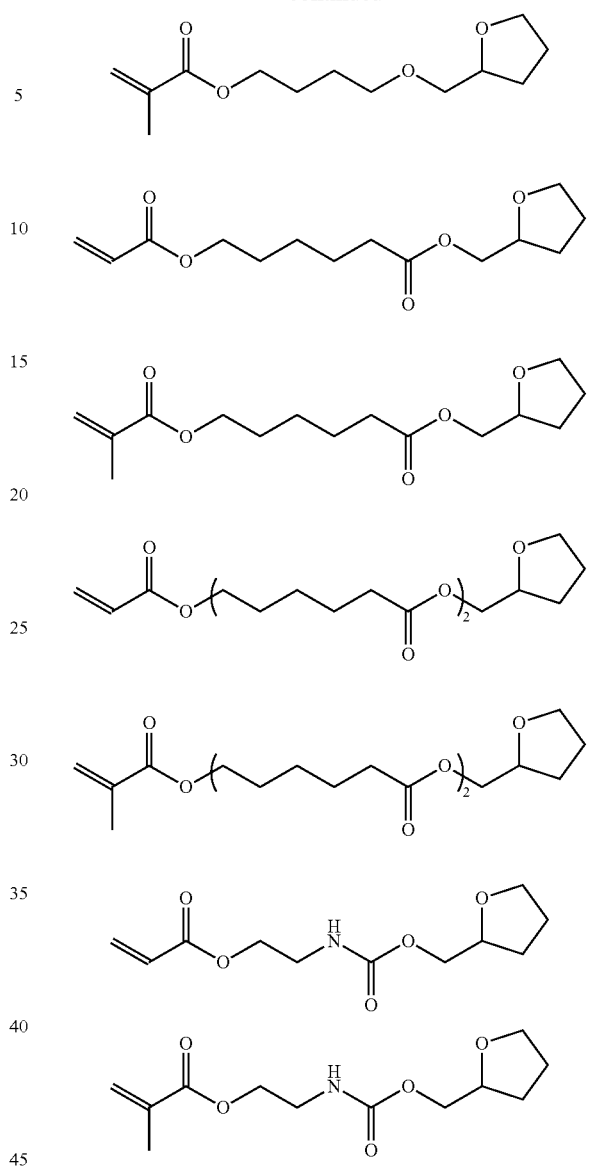

The compound represented by Formula (II) is available as, for example, SR285, CD611, SR203 (manufactured by SARTOMER Japan Inc.), and KAYARAD TC-110S (manufactured by NIPPON KAYAKU Co., Ltd.).

The total content of compounds represented by Formula (II) in the ink composition of the present invention is preferably in the range of 5 to 60 wt % relative to the weight of the entire ink composition, more preferably in the range of 10 to 45 wt %, and yet more preferably in the range of 15 to 40 wt %. When the total content is 5 wt % or greater the adhesion to a substrate is excellent, and when the total content is no greater than 60 wt % the cure rate and scratch resistance are excellent.

Moreover, the compound represented by Formula (I) or Formula (II) may be produced by a conventionally known synthetic method described in, for example, U.S. Pat. No. 3,087,962, J. Chem. Soc., Chem. Commun., Vol. 14, pp. 1073 to 1074 (1986), U.S. Pat. No. 4,097,677, New Journal of Chemistry, Vol. 17, No. 12, pp. 835 to 841 (1993), etc.

A Compound Represented by Formula (III)

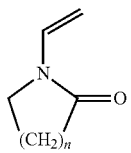

wherein n denotes an integer of 1 to 5.

In Formula (III), n denotes an integer of 1 to 5; n is preferably an integer of 2 to 4 from the viewpoint of flexibility after the ink composition is cured, adhesion to a recording medium, and ease of availability of starting material, n is more preferably an integer of 2 or 4, and n is particularly preferably 4, which is N-vinylcaprolactam. N-vinylcaprolactam is preferable since it has excellent safety, is commonly used and easily available at a relatively low price, and gives particularly good ink curability and adhesion of a cured film to a recording medium.

The total content of compounds represented by Formula (III) in the ink composition of the present invention is preferably in the range of 5 to 60 wt % relative to the weight of the entire ink composition, more preferably in the range of 15 to 35 wt %. When the total content is 5 wt % or greater the adhesion to a substrate is excellent, and when the total content is no greater than 60 wt % the storage stability is excellent.

The total content of compounds represented by Formula (I), Formula (II) and Formula (III) in the ink composition of the present invention is preferably in the range of 15 to 85 wt % relative to the weight of the entire ink composition, more preferably in the range of 25 to 75 wt %, and yet more preferably in the range of 35 to 65 wt %. When the total content of compounds represented by Formula (I), Formula (II) and Formula (III) is in the above mentioned range a balance among cure rate, scratch resistance, adhesion to a substrate and inkjet discharge properties is excellent.

Furthermore, the ink composition of the present invention comprises at least one compound selected from the group consisting of a compound represented by Formula (I), a compound represented by Formula (II), and a compound represented by Formula (III), and preferably comprises at least a compound represented by Formula (I).

Moreover, it more preferably comprises at least one type of compound represented by Formula (I) and at least one compound selected from the group consisting of a compound represented by Formula (II) and a compound represented by Formula (III), and yet more preferably comprises at least one type of compound represented by Formula (I) and at least one type of compound represented by Formula (II). When it comprises at least one type of compound represented by Formula (I) and at least one type of compound represented by Formula (II), it is particularly preferable for it not to comprise a compound represented by Formula (III).

It is preferable for the radically polymerizable compound (C) to have the above-mentioned constitution since curability, adhesion to a recording medium, and image quality are excellent.

Other Polymerizable Compound

The ink composition of the present invention may comprise a radically polymerizable compound other than the compounds represented by Formula (I) to Formula (III), and preferably comprises a (meth)acrylic acid ester compound other than the compounds represented by Formula (I) to Formula (III).

Furthermore, with regard to the radically polymerizable compounds contained in the ink composition of the present invention, it is preferable for at least 90 wt % thereof to be (meth)acrylic acid ester compounds, it is more preferable for at least 95 wt % thereof to be (meth)acrylic acid ester compounds, and it is particularly preferable for all thereof to be (meth)acrylic acid ester compounds.

The (meth)acrylic acid ester compounds include those having a chemical configuration such as monomer, oligomer, or polymer.

With regard to the (meth)acrylic acid ester compound other than a compound represented by Formula (I), Formula (II), or Formula (III), one type thereof may be used on its own or two or more types thereof may be used in combination at any ratio in order to improve a desired property.

In the present specification, when both or either of 'acrylic' and 'methacrylic' are referred to, it might be expressed as '(meth)acrylic', and when both or either of 'acrylate' and 'methacrylate' are referred to, it might be expressed as '(meth)acrylate'.

Specific examples thereof include monofunctional or polyfunctional (meth)acrylic acid ester compounds such as methyl (meth)acrylate, ethyl (meth)acrylate, 2-ethylhexyl (meth)acrylate, n-octyl (meth)acrylate, n-nonyl (meth)acrylate, n-decyl (meth)acrylate, isooctyl (meth)acrylate, n-lauryl (meth)acrylate, n-tridecyl (meth)acrylate, n-cetyl (meth)acrylate, n-stearyl (meth)acrylate, isostearyl (meth)acrylate, cyclohexyl (meth)acrylate, isobornyl (meth)acrylate, adamantyl (meth)acrylate, vinyl (meth)acrylate, allyl (meth)acrylate, phenyl (meth)acrylate, benzyl (meth)acrylate, 2-hydroxyethyl (meth)acrylate, 2-hydroxypropyl (meth)acrylate, 3-hydroxypropyl (meth)acrylate, 2-hydroxybutyl (meth)acrylate, 4-hydroxybutyl (meth)acrylate, 2-methoxyethyl (meth)acrylate, dicyclopentanyloxyethyl (meth)acrylate, 2-phenoxyethyl (meth)acrylate, 2-(2-phenoxyethoxy)ethyl (meth)acrylate, 2-((2-phenyl)benzeneoxy)ethyl (meth)acrylate, 2-dimethylaminoethyl (meth)acrylate, 2-diethylaminoethyl (meth)acrylate, (poly)ethylene glycol mono(meth)acrylate, (poly)ethylene glycol di(meth)acrylate, (poly)ethylene glycol (meth)acrylate methyl ester, (poly)ethylene glycol (meth)acrylate ethyl ester, (poly)ethylene glycol (meth)acrylate phenyl ester, (poly)propylene glycol mono(meth)acrylate, (poly)propylene glycol di(meth)acrylate, (poly)propylene glycol (meth)acrylate methyl ester, (poly)propylene glycol (meth)acrylate ethyl ester, (poly)propylene glycol (meth)acrylate phenyl ester, (poly)propylene glycol diglycidyl ether acrylic acid adduct, 1,4-butanediol di(meth)acrylate, 1,6-hexanediol di(meth)acrylate, 1,9-nonanediol di(meth)acrylate, 1,10-decanediol di(meth)acrylate, neopentyl glycol di(meth)acrylate, bisphenol A EO (ethylene oxide) adduct di(meth)acrylate, bisphenol A PO (propylene oxide) adduct di(meth)acrylate, ethoxylated neopentyl glycol di(meth)acrylate, propoxylated neopentyl glycol di(meth)acrylate, bis((meth)acryloxyethyl)isocyanurate, tris((meth)acryloxyethyl)isocyanurate, trimethylolpropane tri(meth)acrylate, EO-modified trimethylolpropane tri(meth)acrylate, PO-modified trimethylolpropane tri(meth)acrylate, caprolactone-modified trimethylolpropane tri(meth)acrylate, pentaerythritol tri(meth)acrylate, EO-modified pentaerythritol tri(meth)acrylate, PO-modified pentaerythritol tri(meth)acrylate, caprolactone-modified pentaerythritol tri(meth)acrylate, pentaerythritol tetra(meth)acrylate, EO-modified pentaerythritol tetra(meth)acrylate, PO-modified pentaerythritol tetra(meth)acrylate, caprolactone-modified pentaerythritol tetra(meth)acrylate, dipentaerythritol tetra(meth)acrylate, EO-modified dipentaerythritol tetra(meth)acrylate, PO-modified dipentaerythritol tetra(meth)acrylate, caprolactone-modified dipentaerythritol tetra(meth)acrylate, dipentaerythritol hepta(meth)acrylate, EO-modified dipentaerythritol hepta(meth)acrylate, PO-modified dipentaerythritol hepta(meth)acrylate, caprolactone-modified dipentaerythritol hepta(meth)acrylate, dipentaerythritol hexa(meth)acrylate, EO-modified dipentaerythritol hexa(meth)acrylate, PO-modified dipentaerythritol hexa(meth)acrylate, caprolactone-modified dipentaerythritol hexa(meth)acrylate, FANCRYL FA-513A (dicyclopentanyl acrylate), FANCRYL FA-513M (dicyclopentanyl methacrylate), FANCRYL FA-711MM (pentamethyl piperidinyl methacrylate), and FANCRYL FA-712HM (tetramethylpiperidinyl methacrylate) manufactured by Hitachi Chemical Co., Ltd., and the SR & CD series of functional monomers and, sold as functional oligomers, the CN series, manufactured by Sartomer Japan Inc.

More specifically, radically polymerizable or crosslinkable methacrylic acid ester monomers, oligomers, prepolymers, and polymers that are commercial products or are industrially known, such as those described in 'Kakyozai Handobukku' (Crosslinking Agent Handbook), Ed. S. Yamashita (Taiseisha, 1981); 'UV•EB Koka Handobukku (Genryohen)' (UV•EB Curing Handbook (Starting Materials)) Ed. K. Kato (Kobunshi Kankoukai, 1985); 'UV•EB Koka Gijutsu no Oyo to Shijyo' (Application and Market of UV•EB Curing Technology), p. 79, Ed. RadTech (CMC, 1989); and E. Takiyama 'Poriesuteru Jushi Handobukku' (Polyester Resin Handbook), (The Nikkan Kogyo Shimbun Ltd., 1988) may be used.

Furthermore, as the radically polymerizable compound, for example, photocuring type polymerizable compounds used in photopolymerizable compositions described in publications such as JP-A-7-159983 (JP-A denotes a Japanese unexamined patent application publication), JP-B-7-31399 (JP-B denotes a Japanese examined patent application publication), JP-A-8-224982, JP-A-10-863, JP-A-9-134011, and published Japanese translation 2004-514014 of a PCT application are known, and (meth)acrylic acid esters described therein may also be applied to the ink composition of the present invention.

Among them, isobornyl (meth)acrylate, 2-phenoxyethyl (meth)acrylate, PO-modified neopentyl glycol di(meth)acrylate, 1,6-hexanediol di(meth)acrylate, dipropylene glycol di(meth)acrylate, trimethylolpropane tri(meth)acrylate, caprolactone-modified dipentaerythritol hexa(meth)acrylate, and a urethane (meth)acrylate oligomer can be cited as preferred examples.

From the viewpoint of cure rate and flexibility, the content of the (meth)acrylic acid ester compound other than a compound represented by Formula (I), Formula (II), or Formula (III) in the ink composition of the present invention is preferably in the range of 1 to 60 wt % relative to the weight of the entire ink composition, more preferably in the range of 1 to 50 wt %, and yet more preferably in the range of 1 to 40 wt %.

From the viewpoint of cure rate being fast and image strength being high, the (meth)acrylic acid ester compound other than a compound represented by Formula (I), Formula (II), or Formula (III) preferably comprises a polyfunctional (meth)acrylic acid ester compound, and more preferably comprises a 3- to 6-functional (meth)acrylic acid ester compound. With regard to the 3- to 6-functional (meth)acrylic acid ester compound, one having a molecular weight of less than 500 is preferable.

From the viewpoint of curability and scratch resistance, the polyfunctional (meth)acrylic acid ester compound preferably comprises a urethane (meth)acrylate oligomer. The number of functional groups of the urethane (meth)acrylate oligomer is preferably 2 or 3, and more preferably 2. The weight-average molecular weight of the urethane (meth)acrylate oligomer is preferably at least 500, and more preferably 500 to 50,000.

In the present invention, it is preferable to use, as the polyfunctional (meth)acrylic acid ester compound, a 3- to 6-functional (meth)acrylic acid ester compound having a molecular weight of less than 500 and a difunctional urethane (meth)acrylate oligomer in combination.

When a polyfunctional (meth)acrylic acid ester is contained, the content of the polyfunctional (meth)acrylic acid ester compound is preferably in the range of 1 to 25 wt % relative to the weight of the entire ink composition, more preferably in the range of 3 to 20 wt %, and yet more preferably in the range of 5 to 15 wt %.

The ink composition of the present invention preferably comprises as the other polymerizable compound a monofunctional (meth)acrylic acid ester other than the compounds represented by Formula (I) to Formula (III).

From the viewpoint of inkjet discharge properties, the monofunctional (meth)acrylic acid ester is preferably a monofunctional (meth)acrylic acid ester having an aryl group having 6 to 20 carbon atoms, more preferably a monofunctional (meth)acrylic acid ester having a phenyl group, yet more preferably a compound in which a phenyl group and a (meth)acryloyloxy group are bonded via —$(OR)_n$—, and particularly preferably a phenoxyethyl (meth)acrylic acid ester. In addition, the oxygen atom in —$(OR)_n$— is bonded to the phenyl group, R denotes an alkylene group having 1 to 10 carbon atoms, and n denotes an integer of 1 to 10.

From the viewpoint of inkjet discharge properties, the content of the above-mentioned monofunctional (meth)acrylate other than the compounds represented by Formula (I) to Formula (III) is preferably 5 to 75 wt % relative to the weight of the entire ink composition, more preferably 10 to 55 wt %, and yet more preferably 15 to 45 wt %.

In the ink composition of the present invention, a radically polymerizable compound other than the above-mentioned (meth)acrylic acid ester compound may be used as a radically polymerizable compound.

Examples of such a radically polymerizable compound other than the above-mentioned (meth)acrylic acid ester compound include a (meth)acrylamide compound, a vinyl ether compound, a vinyl ester compound, an ester compound of an unsaturated carboxylic acid such as itaconic acid, crotonic acid, isocrotonic acid, or maleic acid, a polybutadiene compound, and a styrene compound.

Specific examples of the (meth)acrylamide compound include (meth)acrylamide, N-methyl (meth)acrylamide, N-isopropyl (meth)acrylamide, N-t-butyl (meth)acrylamide, N-cyclohexyl (meth)acrylamide, N-dodecyl (meth)acrylamide, N,N-dimethyl (meth)acrylamide, N,N-diethyl (meth)acrylamide, N-phenyl (meth)acrylamide, N-(hydroxymethyl) (meth)acrylamide, N-(2-hydroxyethyl) (meth)acrylamide, N-(meth)acryloylmorpholine, N-(3-dimethylaminopropyl) (meth)acrylamide, N-(1,1-dimethyl-3-oxobutyl) (meth)acrylamide, N-(butoxymethyl) (meth)acrylamide, N-(4-hydroxyphenyl) (meth)acrylamide, N,N'-(1,2-dihydroxyethylene) bis(meth)acrylamide, N,N'-methylenebis(meth)acrylamide.

Specific examples of the vinyl ether compound include di- or tri-vinyl ether compounds such as ethylene glycol divinyl ether, diethylene glycol divinyl ether, triethylene glycol divinyl ether, propylene glycol divinyl ether, dipropylene glycol divinyl ether, butanediol divinyl ether, hexanediol divinyl ether, cyclohexanedimethanol divinyl ether, and trimethylolpropane trivinyl ether; and monovinyl ether compounds such as ethyl vinyl ether, n-butyl vinyl ether, isobutyl vinyl ether, octadecyl vinyl ether, cyclohexyl vinyl ether, hydroxybutyl vinyl ether, 2-ethylhexyl vinyl ether, cyclohexanedimethanol monovinyl ether, n-propyl vinyl ether, isopropyl vinyl ether, isopropenyl vinyl ether, dodecyl vinyl ether, diethylene glycol monovinyl ether, octadecyl vinyl ether, ethylene glycol monovinyl ether, triethylene glycol monovinyl ether, hydroxyethyl monovinyl ether, and hydroxynonyl monovinyl ether.

Specific examples of the vinyl ester compound include divinyl 1,4-cyclohexanedicarboxylate, vinyl pivalate, vinyl p-anisate, vinyl 3-cyclohexenecarboxylate, divinyl adipate, divinyl terephthalate, divinyl 1,3-adamantanedicarboxylate, tetravinyl 1,1,2,3-propanetetracarboxylate, tetravinyl bicyclo[2.2.2]oct-7-ene-2,3,5,6-tetracarboxylate, vinyl methacrylate, divinyl 5-norbornene-2,3-dicarboxylate, tetravinyl 1,2,4,5-cyclohexanetetracarboxylate, and divinyl 2,5-pyridinedicarboxylate.

From the viewpoint of storage stability and image quality, the content of the radically polymerizable compound other than a (meth)acrylic acid ester compound in the ink composition of the present invention is preferably in the range of 0 to 15 wt % relative to the weight of the entire ink composition, more preferably in the range of 0 to 10 wt %, yet more preferably in the range of 0 to 5 wt %, and particularly preferably none.

(D) Polymerization Initiator

The ink composition comprises (D) a polymerization initiator.

As a polymerization initiator that can be used in the present invention, a known radical polymerization initiator may be used. The radical polymerization initiator that can be used in the present invention may be used singly or in a combination of two or more types.

The radical polymerization initiator that can be used in the ink composition of the present invention is a compound that forms a polymerization initiating species by absorbing external energy. The external energy used for initiating polymerization can be broadly divided into heat and actinic radiation, a thermal polymerization initiator and a photopolymerization initiator are used respectively, and a photopolymerization initiator are preferably used. Examples of the actinic radiation include γ rays, β rays, an electron beam, ultraviolet rays, visible light, and infrared rays, and preferred examples include ultraviolet rays.

Examples of the radical polymerization initiator that can be used in the present invention include (a) an aromatic ketone, (b) an acylphosphine compound, (c) an aromatic onium salt compound, (d) an organic peroxide, (e) a thio compound, (f) a hexaarylbiimidazole compound, (g) a ketoxime ester compound, (h) a borate compound, (i) an azinium compound, (j) a metallocene compound, (k) an active ester compound, and (l) a compound having a carbon-halogen bond. With regard to these radical polymerization initiators, the above-mentioned compounds (a) to (l) may be used singly or in combination. The radical polymerization initiator in the present invention may suitably be used singly or in a combination of two or more types.

Preferred examples of the aromatic ketone (a) and the thio compound (e) include a compound having a benzophenone skeleton or a compound having a thioxanthone skeleton described in 'RADIATION CURING IN POLYMER SCIENCE AND TECHNOLOGY' J. P. FOUASSIER and J. F. RABEK (1993), pp. 77 to 117. Preferred examples of the aromatic ketone (a), the acylphosphine compound (b) and the thio compound (e) include an α-thiobenzophenone compound described in JP-B-47-6416, a benzoin ether compound described in JP-B-47-3981, an α-substituted benzoin compound described in JP-B-47-22326, a benzoin derivative described in JP-B-47-23664, an aroylphosphonic acid ester described in JP-A-57-30704, a dialkoxybenzophenone described in JP-B-60-26483, benzoin ethers described in JP-B-60-26403 and JP-A-62-81345, α-aminobenzophenones described in JP-B-1-34242, U.S. Pat. No. 4,318,791, and EP No. 0284561A1, p-di(dimethylaminobenzoyl)benzene described in JP-A-2-211452, a thio-substituted aromatic ketone described in JP-A-61-194062, an acylphosphine sulfide described in JP-B-2-9597, an acylphosphine described in JP-B-2-9596, a thioxanthone described in JP-B-63-61950, and a coumarin described in JP-B-59-42864.

Preferred examples of the acylphosphine compound (b) include acylphosphine oxide compounds described in paragraphs 0080 to 0098 of JP-A-2009-096985, and among them a compound having in its structure a structure represented by Formula (D-1) or Formula (D-2) is preferable.

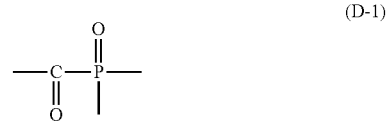

(D-1)

(D-2)

In particular, as the acylphosphine oxide compound, one having a chemical structure of Formula (D-3) or Formula (D-4) is particularly preferable.

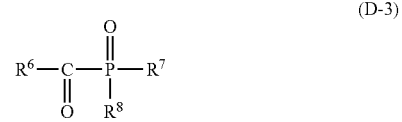

(D-3)

Wherein $R^6$, $R^7$, and $R^8$ denote an aromatic hydrocarbon group, which may have a methyl group or an ethyl group as a substituent.

With regard to a monoacylphosphine oxide compound represented by Formula (D-3), it is preferable that $R^6$ to $R^8$ are phenyl groups, which may have a methyl group as a substituent, and it is more preferable that $R^7$ and $R^8$ are phenyl groups and $R^6$ is a phenyl group having 1 to 3 methyl groups.

Among them, as the monoacylphosphine oxide compound represented by Formula (D-3), 2,4,6-trimethylbenzoyldiphenylphosphine oxide (Darocur TPO manufactured by Ciba Specialty Chemicals, Lucirin TPO manufactured by BASF) is preferable.

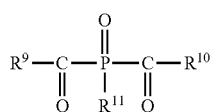
(D-4)

Wherein $R^9, R^{10}, R^{11}$ denote an aromatic hydrocarbon group, which may have a methyl group or an ethyl group as a substituent.

In the present invention, with regard to a bisacylphosphine oxide compound represented by Formula (D-4), it is preferable that $R^9$ to $R^{11}$ are phenyl groups, which may have a methyl group as a substituent, and it is more preferable that $R^{11}$ is a phenyl group and $R^9$ and $R^{10}$ are phenyl groups having 1 to 3 methyl groups.

Among them, as the bisacylphosphine oxide compound represented by Formula (D-4), bis(2,4,6-trimethylbenzoyl) phenylphosphine oxide (IRGACURE 819, manufactured by Ciba Specialty Chemicals) is preferable.

As the aromatic onium salt compound (c), there can be cited aromatic onium salts of elements of Groups 15, 16, and 17 of the periodic table, specifically, N, P, As, Sb, Bi, O, S, Se, Te, and I. Examples thereof include iodonium salts described in EP No. 104143, U.S. Pat. No. 4,837,124, JP-A-2-150848, and JP-A-2-96514, diazonium salts (optionally substituted benzenediazoniums, etc.) described in EP Nos. 370693, 233567, 297443, 297442, 279210, and 422570, U.S. Pat. Nos. 3,902,144, 4,933,377, 4,760,013, 4,734,444, and 2,833,827, diazonium salt resins (diazodiphenylamine formaldehyde resins, etc.), N-alkoxypyridinium salts, etc. (e.g. those described in U.S. Pat. No. 4,743,528, JP-A-63-138345, JP-A-63-142345, JP-A-63-142346, and JP-B-46-42363; specific examples thereof include 1-methoxy-4-phenylpyridinium tetrafluoroborate); furthermore, compounds described in JP-B-52-147277, 52-14278, and 52-14279 may suitably be used. A radical or an acid is formed as an active species.

As the organic peroxide (d), almost all organic compounds having at least one oxygen-oxygen bond per molecule can be cited, and preferred examples thereof include peroxide ester compounds such as 3,3',4,4'-tetra(t-butylperoxycarbonyl) benzophenone, 3,3',4,4'-tetra(t-amylperoxycarbonyl)benzophenone, 3,3',4,4'-tetra(t-hexylperoxycarbonyl)benzophenone, 3,3',4,4'-tetra(t-octylperoxycarbonyl)benzophenone, 3,3',4,4'-tetra(cumylperoxycarbonyl)benzophenone, 3,3',4,4'-tetra(p-isopropylcumylperoxycarbonyl)benzophenone, and di-t-butyldiperoxyisophthalate.

As the hexaarylbiimidazole compound (f), there can be cited lophine dimers described in JP-B-45-37377 and JP-B-44-86516, and examples thereof include 2,2'-bis(o-chlorophenyl)-4,4',5,5'-tetraphenylbiimidazole, 2,2'-bis(o-bromophenyl)-4, 4',5,5'-tetraphenylbiimidazole, 2,2'-bis(o,p-dichlorophenyl)-4,4',5,5'-tetraphenylbiimidazole, 2,2'-bis(o-chlorophenyl)-4,4',5,5'-tetra(m-methoxyphenyl) biimidazole, 2,2'-bis(o,o'-dichlorophenyl)-4,4',5,5'-tetraphenylbiimidazole, 2,2'-bis(o-nitrophenyl)-4,4',5,5'-tetraphenylbiimidazole, 2,2'-bis(o-methylphenyl)-4,4',5,5'-tetraphenylbiimidazole, and 2,2'-bis(o-trifluorophenyl)-4,4', 5,5'-tetraphenylbiimidazole.

As the ketoxime ester compound (g), there can be cited 3-benzoyloxyiminobutan-2-one, 3-acetoxyiminobutan-2-one, 3-propionyloxyiminobutan-2-one, 2-acetoxyiminopentan-3-one, 2-acetoxyimino-1-phenylpropan-1-one, 2-benzoyloxyimino-1-phenylpropan-1-one, 3-p-toluenesulfonyloxyiminobutan-2-one, and 2-ethoxycarbonyloxyimino-1-phenylpropan-1-one.

Examples of the borate compound (h) include compounds described in U.S. Pat. Nos. 3,567,453 and 4,343,891, and EP Nos. 109,772 and 109,773.

Examples of the azinium salt compound (i) include N—O bond-containing compounds described in JP-A-63-138345, JP-A-63-142345, JP-A-63-142346, JP-A-63-143537, and JP-B-46-42363.

Examples of the metallocene compound (j) include titanocene compounds described in JP-A-59-152396, JP-A-61-151197, JP-A-63-41484, JP-A-2-249, and JP-A-2-4705, and iron-arene complexes described JP-A-1-304453 and JP-A-1-152109.

Specific examples of the titanocene compound include dicyclopentadienyl-Ti-dichloride, dicyclopentadienyl-Ti-bis-phenyl, di-cyclopentadienyl-Ti-bis-2,3,4,5,6-pentafluorophen-1-yl, dicyclopentadienyl-Ti-bis-2,3,5,6-tetrafluorophen-1-yl, dicyclopentadienyl-Ti-bis-2,4,6-trifluorophen-1-yl, dicyclopentadienyl-Ti-2,6-difluorophen-1-yl, dicyclopentadienyl-Ti-bis-2,4-difluorophen-1-yl, dimethylcyclopentadienyl-Ti-bis-2,3,4,5,6-pentafluorophen-1-yl, dimethylcyclopentadienyl-Ti-bis-2,3,5,6-tetrafluorophen-1-yl, dimethylcyclopentadienyl-Ti-bis-2,4-difluorophen-1-yl, bis(cyclopentadienyl)-bis(2,6-difluoro-3-(pyrrol-1-yl)phenyl)titanium, bis(cyclopentadienyl)bis[2,6-difluoro-3-(methylsulfonamido)phenyl]titanium, and bis(cyclopentadienyl) bis[2,6-difluoro-3-(N-butylbiaroylamino)phenyl]titanium.

Examples of the active ester compound (k) include nitrobenzyl ester compounds described in EP Nos. 0290750, 046083, 156153, 271851, and 0388343, U.S. Pat. Nos. 3,901, 710 and 4,181,531, JP-A-60-198538, and JP-A-53-133022, iminosulfonate compounds described in EP Nos. 0199672, 84515, 199672, 044115, and 0101122, U.S. Pat. Nos. 4,618, 564, 4,371,605, and 4431774, JP-A-64-18143, JP-A-2-245756, and JP-A-4-365048, and compounds described in JP-B-62-6223, JP-B-63-14340, and JP-A-59-174831.

Preferred examples of the compound (l) having a carbon-halogen bond include a compound described in Wakabayashi et. al, Bull. Chem. Soc. Japan, 42, 2924 (1969), a compound described in British Patent No. 1388492, a compound described in JP-A-53-133428, and a compound described in German Patent No. 3337024.

Examples further include a compound described in F. C. Schaefer et al., J. Org. Chem., 29, 1527 (1964), a compound described in JP-A-62-58241, a compound described in JP-A-5-281728, a compound described in German Pat. No. 2641100, a compound described in German Pat. No. 3333450, compounds described in German Pat. No. 3021590, and compounds described in German Pat. No. 3021599.

In the present invention, it is preferable to use as the polymerization initiator an acylphosphine compound and an aromatic ketone in combination. It is preferable to use an acylphosphine oxide as the acylphosphine compound, and it is more preferable to use a monoacylphosphine oxide and a bisacylphosphine oxide in combination.

In the ink composition of the present invention, the total amount of radical polymerization initiator used is preferably 1 to 25 wt % relative to the total amount of the ink composition, more preferably 2 to 20 wt %, yet more preferably 3 to 15 wt % and especially preferably 4 to 9 wt %. The ink composition can be cured sufficiently with 1 wt % or greater of polymerization initiator, and a cured film having a uniform degree of curing can be obtained with 25 wt % or less.

(E) Other Component

The ink composition of the present invention may comprise a component other than components (A) to (D) above as necessary.

As the other component, a known additive may be used, and examples thereof include an amine compound, a UV absorber, an antioxidant, an antifading agent, a conductive salt, a solvent, a polymer compound, a surfactant, a levelling additive, a matting agent, a wax, a tackifier, or a sensitizer.

Amine Compound

For the purpose of improving storage stability or radical generation efficiency of a radical initiator, the ink composition of the present invention preferably comprises an amine compound.

The amine compound that can be used in the present invention is not particularly limited, and a conventionally known amine compound may be used without any particular restrictions.

Furthermore, the amine compound may be a compound having one amine moiety in the molecule or a compound having two or more amine moieties in the molecule, and may have a substituent such as an alkyl group, an alkenyl group, an alkynyl group, a halogen atom (—F, —Br, —Cl, —I), a hydroxy group, an alkoxy group, an aryloxy group, an alkylthio group, an arylthio group, an acyl group, an acyloxy group, an alkoxycarbonyl group, or an aryloxycarbonyl group.

From the viewpoint of safety, the amine compound that can be used in the present invention preferably has a boiling point at standard atmospheric pressure of at least 120° C., more preferably at least 150° C., and yet more preferably at least 180° C.

The molecular weight of the amine compound is preferably in the range of 100 to 1,000, more preferably in the range of 150 to 800, and yet more preferably in the range of 200 to 600.

Specific examples of the amine compound include compounds described in M. R. Sander et al., 'Journal of Polymer Society' Vol. 10, p. 3173 (1972), JP-B-44-20189, JP-A-51-82102, JP-A-52-134692, JP-A-59-138205, JP-A-60-84305, JP-A-62-18537, JP-A-64-33104, and Research Disclosure 33825, and specific examples thereof include triethanolamine, ethyl p-dimethylaminobenzoate, p-formyldimethylaniline, and p-methylthiodimethylaniline.

The amount added is appropriately selected according to the structure of the amine compound used and the intended application, and is preferably 0 to 15 wt % relative to the weight of the entire ink composition, and more preferably 0 to 10 wt %.

UV Absorber

A UV absorber may be used from the viewpoint of improving the weather resistance of an image obtained and preventing discoloration.

The UV absorbers include benzotriazole compounds described in JP-A-58-185677, JP-A-61-190537, JP-A-2-782, JP-A-5-197075 and JP-A-9-34057; benzophenone compounds described in JP-A-46-2784, JP-A-5-194483 and U.S. Pat. No. 3,214,463; cinnamic acid compounds described in JP-B-48-30492, JP-B-56-21141 and JP-A-10-88106; triazine compounds described in JP-A-4-298503, JP-A-8-53427, JP-A-8-239368, JP-A-10-182621 and JP-W-8-501291 (the term "JP-W" as used herein means an unexamined published international patent application); compounds described in Research Disclosure No. 24239; and compounds represented by stilbene and benzoxazole compounds, which absorb ultraviolet rays to emit fluorescence, the so-called fluorescent brightening agents.

The amount thereof added is appropriately selected according to the intended application, and it is preferably 0 to 5 wt % relative to the weight of the entire ink composition.

Antioxidant

In order to improve the stability of the ink composition, an antioxidant may be added.

Examples of the antioxidant include those described in Laid-open European Patent Nos. 223739, 309401, 309402, 310551, 310552, and 459416, Laid-open German Patent No. 3435443, JP-A-54-48535, JP-A-62-262047, JP-A-63-113536, JP-A-63-163351, JP-A-2-262654, JP-A-2-71262, JP-A-3-121449, JP-A-5-61166, JP-A-5-119449, and U.S. Pat. Nos. 4,814,262 and 4,980,275.

The amount thereof added is appropriately selected according to the intended application, and it is preferably 0 to 5 wt % relative to the weight of the entire ink composition.

Antifading Agent

The ink composition of the present invention may employ various organic and metal complex antifading agents.

The organic antifading agents include hydroquinones, alkoxyphenols, dialkoxyphenols, phenols, anilines, amines, indanes, chromans, alkoxyanilines, and heterocycles.

The metal complex antifading agents include nickel complexes and zinc complexes. More specifically, there can be used compounds described in patents cited in Research Disclosure, No. 17643, Items VII-I to J, ibid., No. 15162, ibid., No. 18716, page 650, left-hand column, ibid., No. 36544, page 527, ibid., No. 307105, page 872, and ibid., No. 15162, and compounds contained in general formulae and compound examples of typical compounds described in JP-A-62-21572, pages 127 to 137.

The amount thereof added is appropriately selected according to the intended application, and it is preferably 0 to 5 wt % relative to the weight of the entire ink composition.

Conductive Salt

The ink composition of the present invention may contain, for the purpose of controlling discharge properties, a conductive salt such as potassium thiocyanate, lithium nitrate, ammonium thiocyanate, or dimethylamine hydrochloride.

Solvent

It is also effective to add a trace amount of organic solvent to the ink composition of the present invention in order to improve the adhesion to a recording medium.

Examples of the solvent include ketone-based solvents such as acetone, methyl ethyl ketone, and diethyl ketone, alcohol-based solvents such as methanol, ethanol, 2-propanol, 1-propanol, 1-butanol, and tert-butanol, chlorine-based solvents such as chloroform and methylene chloride, aromatic-based solvents such as benzene and toluene, ester-based solvents such as ethyl acetate, butyl acetate, and isopropyl acetate, ether-based solvents such as diethyl ether, tetrahydrofuran, and dioxane, and glycol ether-based solvents such as ethylene glycol monomethyl ether and ethylene glycol dimethyl ether.

In this case, it is effective if the amount thereof added is in a range that does not cause problems with the solvent resistance or the VOC, and the amount is preferably 5 wt % or less relative to the total amount of the ink composition, and more preferably 3 wt % or less. Yet more preferably there is no use of the solvent.

High Molecular Weight Compound

The ink composition may contain various types of high molecular weight compounds in order to adjust film physical properties.

Examples of the high molecular weight compounds include acrylic polymers, polyvinylbutyral resins, polyurethane resins, polyamide resins, polyester resins, epoxy resins, phenol resins, polycarbonate resins, polyvinylformal resins, shellac, vinylic resins, acrylic resins, rubber-based resins, waxes, and other natural resins.

They may be used singly or in a combination of two or more types. Among these, a vinylic copolymer obtained by copolymerization of an acrylic monomer is preferable.

Furthermore, as a copolymer component of the high molecular weight compound, a copolymer containing as a structural unit a 'carboxyl group-containing monomer', an 'alkyl methacrylate ester', or an 'alkyl acrylate ester' may preferably be used.

Surfactant

The ink composition of the present invention may contain a surfactant.

As the surfactant, those described in JP-A-62-173463 and JP-A-62-183457 can be cited. Examples thereof include anionic surfactants such as dialkylsulfosuccinic acid salts, alkylnaphthalene sulfonic acid salts, and fatty acid salts; nonionic surfactants such as polyoxyethylene alkyl ethers, polyoxyethylene alkyl aryl ethers, acetylene glycols, polyoxyethylene/polyoxypropylene block copolymers, and silicone oil; and cationic surfactants such as alkylamine salts and quaternary ammonium salts. An organofluoro compound may be used instead of the above-mentioned surfactant. The organofluoro compound is preferably hydrophobic. Examples of the organofluoro compound include fluorine-based surfactants, oil-like fluorine-based compounds (e.g. fluorine oil), solid fluorine compound resins (e.g. tetrafluoroethylene resin), and those described in JP-B-57-9053 (paragraphs 8 to 17) and JP-A-62-135826.

The content of the surfactant in the ink composition is appropriately adjusted so as to give a surface tension that is suitable for discharge from an inkjet head, and is preferably 0 to 6 wt %, more preferably 0 to 4 wt %, and yet more preferably 0 to 2 wt %.

In addition to the above, the composition may contain as necessary, for example, a leveling additive, a matting agent, a wax for adjusting film physical properties, or a tackifier in order to improve the adhesion to a recording medium such as polyolefin or PET, the tackifier not inhibiting polymerization.

Specific examples of the tackifier include high molecular weight tacky polymers described on pp. 5 and 6 of JP-A-2001-49200 (e.g. a copolymer formed from an ester of (meth) acrylic acid and an alcohol having an alkyl group with 1 to 20 carbons, an ester of (meth)acrylic acid and an alicyclic alcohol having 3 to 14 carbons, or an ester of (meth)acrylic acid and an aromatic alcohol having 6 to 14 carbons), and a low molecular weight tackifying resin having a polymerizable unsaturated bond.

Sensitizer

The ink composition of the present invention may comprise as necessary a sensitizer for the purpose of improving radical generation efficiency of a radical polymerization initiator and lengthening the photosensitive wavelength.

Any sensitizer may be used without particular restriction as long as it absorbs actinic radiation and sensitizes a radical polymerization initiator by an electron transfer mechanism or an energy transfer mechanism, but it is preferable to use a compound having an absorption maximum at 300 to 400 nm in order to prevent unwanted discoloration of the ink composition.

Preferred examples of the sensitizer include polynuclear aromatic compounds such as anthracene, a 9,10-dialkoxyanthracene, pyrene, perylene, and triphenylene, thioxanthone compounds such as isopropylthioxanthone, xanthene compounds such as fluorescein, eosin, erythrosine, rhodamine B, and Rose Bengal, cyanine compounds such as thiacarbocyanine and oxacarbocyanine, merocyanine compounds such as merocyanine and carbomerocyanine, thiazine compounds such as thionine, methylene blue, and toluidine blue, acridine compounds such as acridine orange, chloroflavine, and acriflavine, anthraquinone compounds, squarium compounds, coumarin compounds such as 7-diethylamino-4-methylcoumarin, and heterocyclic compounds such as phenolthiazine and an N-aryloxazolidinone, and among them polynuclear aromatic compounds and thioxanthone compounds are preferable.

The content of the sensitizer in the ink composition of the present invention is appropriately selected according to the intended purpose, and is preferably 0 to 10 wt % relative to the weight of the entire ink composition.

Properties of Ink

From the viewpoint of discharge property, the ink composition of the present invention has a viscosity at 25° C. of preferably not more than 40 mPa·s, more preferably 5 to 40 mPa·s, and yet more preferably 7 to 30 mPa·s. Furthermore, the viscosity of the ink composition at the discharge temperature (preferably 25° C. to 80° C., and more preferably 25° C. to 50° C.) is preferably 3 to 20 mPa·s, and more preferably 3 to 15 mPa·s. With regard to the ink composition of the present invention, it is preferable that its component ratio is appropriately adjusted so that the viscosity is in the above-mentioned range. When the viscosity at room temperature is set to be high, even when a porous recording medium is used, penetration of the ink composition into the recording medium can be prevented, and uncured monomer can be reduced. Furthermore, ink spreading when ink composition droplets have landed can be suppressed, and as a result there is the advantage that the image quality is improved.

The surface tension of the ink composition of the present invention at 25° C. is preferably 20 to 50 mN/m, and more preferably 23 to 40 mN/m. When recording is carried out on various types of recording medium such as polyolefin, PET, coated paper, and uncoated paper, from the viewpoint of spread and penetration, it is preferably at least 20 mN/m, and from the viewpoint of wettability it is preferably not more than 50 mN/m.

(2) Inkjet Recording Method, Inkjet Recording Device, and Printed Material

The inkjet recording method of the present invention is a method for forming an image by discharging the ink composition of the present invention onto a recording medium (e.g. support, recording material) for inkjet recording and curing the ink by irradiating the ink composition so discharged onto the recording medium with actinic radiation.

More specifically, the inkjet recording method of the present invention comprises (a$^1$) a step of discharging the ink composition of the present invention onto a recording medium and (b$^1$) a step of curing the ink composition by irradiating the ink composition so discharged with actinic radiation.

The inkjet recording method of the present invention comprises the above steps, and thus forms an image from the ink composition cured on the recording medium.

The printed material of the present invention is a printed material recorded by the inkjet recording method of the present invention.

The inkjet recording method of the present invention may employ an inkjet recording device that will be described in detail below.

Inkjet Recording Device

An inkjet recording device used in the inkjet recording method of the present invention is not particularly limited, and any known inkjet recording device that can achieve an intended resolution may be used. That is, any known inkjet recording device, such as a commercial product, may be used in order to discharge an ink composition onto a recording medium in step ($a^1$) of the inkjet recording method of the present invention.

The inkjet recording device that can be used in the present invention is equipped with, for example, an ink supply system, a temperature sensor, and an actinic radiation source.

The ink supply system comprises, for example, a main tank containing the ink composition of the present invention, a supply pipe, an ink supply tank immediately before an inkjet head, a filter, and a piezo system inkjet head. The piezo system inkjet head may be driven so as to discharge a multi-size dot of preferably 1 to 100 pL, and more preferably 8 to 30 pL, at a resolution of preferably 320×320 to 4,000×4,000 dpi, more preferably 400×400 to 1,600×1,600 dpi, and yet more preferably 720×720 dpi. Here, dpi referred to in the present invention means the number of dots per 2.54 cm.

As described above, since it is desirable for the radiation curing type ink composition to be discharged at a constant temperature, the inkjet recording device is preferably equipped with a temperature stabilizer for stabilizing the temperature of the ink composition. Parts to be controlled to a constant temperature include all of the supply pipe system and the members from the ink tank (including an intermediate tank if it is provided) to the discharging face of the nozzle. A section from the ink supply tank to the inkjet head is thermally insulated and heated.

A method of controlling temperature is not particularly limited, but it is preferable to provide, for example, temperature sensors at a plurality of pipe section positions, and control heating according to the ink composition flow rate and the temperature of the surroundings. The temperature sensors may be provided on the ink supply tank and in the vicinity of the inkjet head nozzle. Furthermore, the head unit that is to be heated is preferably thermally shielded or insulated so that the device main body is not influenced by the temperature of the outside air. In order to reduce the printer start-up time required for heating, or in order to reduce the thermal energy loss, it is preferable to thermally insulate the head unit from other sections and also to reduce the heat capacity of the entire heated unit.

The ink composition is preferably discharged using the above mentioned inkjet recording device after being heated to preferably 25° C. to 80° C., and more preferably 25° C. to 50° C., so as to reduce the viscosity of the ink composition to preferably 3 to 20 mPa·s, and more preferably 3 to 15 mPa·s. In particular, it is preferable to use the ink composition having an ink viscosity at 25° C. of not more than 50 mPa·s since a good discharge stability can be obtained. By employing this method, high discharge stability can be realized.

The actinic radiation curing type ink composition for inkjet recording such as the ink composition of the present invention generally has a viscosity that is higher than that of a water-based ink composition used for an inkjet recording ink, and variation in viscosity due to a change in temperature at the time of discharge is large. Viscosity variation in the ink composition has a large effect on changes in liquid droplet size and changes in liquid droplet discharge speed and, consequently, causes the image quality to be degraded. It is therefore necessary to maintain the ink composition discharge temperature as constant as possible. In the present invention, the control range for the temperature of the ink composition is preferably ±5° C. of a set temperature, more preferably ±2° C. of the set temperature, and yet more preferably ±1° C. of the set temperature.

The step ($b^1$) of curing the ink composition by irradiating the discharged ink composition with actinic radiation is now explained.

The ink composition discharged onto the recording medium cures upon exposure to actinic radiation. This is due to an initiating species such as a radical being generated by decomposition of the radical polymerization initiator contained in the ink composition of the present invention by irradiation with radiation, the radical functioning so as to make a polymerization reaction of a radically polymerizable compound take place and to promote it. In this process, if a sensitizer is present together with the radical polymerization initiator in the ink composition, the sensitizer in the system absorbs radiation, becomes excited, and promotes decomposition of the radical polymerization initiator by contact with the radical polymerization initiator, thus enabling a curing reaction with higher sensitivity to be achieved.

The actinic radiation used in this process may include α rays, γ rays, an electron beam, X rays, UV rays, visible light, and IR rays. Although it depends on the absorption characteristics of the radical polymerization initiator or the sensitizer, the peak wavelength of the actinic radiation is preferably 150 to 500 nm, more preferably 200 to 450 nm, and yet more preferably 250 to 400 nm.

Furthermore, the ink composition of the present invention has sufficient sensitivity for low output actinic radiation. The actinic radiation is applied therefore so that the illumination intensity on the exposed surface is preferably 10 to 4,000 mW/cm$^2$, and more preferably 20 to 2,500 mW/cm$^2$.

As an actinic radiation source, a mercury lamp, a gas/solid laser, etc. are mainly used, and for UV photocuring type ink composition for inkjet recording a mercury lamp and a metal halide lamp are widely known. However, from the viewpoint of protection of the environment, there has recently been a strong desire for mercury not to be used, and replacement by a GaN semiconductor UV light emitting device is very useful from industrial and environmental viewpoints. Furthermore, LEDs (UV-LED) and LDs (UV-LD) have small dimensions, long life, high efficiency, and low cost, and their use as a photocuring inkjet light source can be expected.

Furthermore, light-emitting diodes (LED) and laser diodes (LD) may be used as the source of actinic radiation. In particular, when a UV ray source is needed, a UV-LED or a UV-LD may be used. For example, Nichia Corporation has marketed a violet LED having a wavelength of the main emission spectrum of between 365 nm and 420 nm. Furthermore, when a shorter wavelength is needed, U.S. Pat. No. 6,084,250 discloses an LED that can emit actinic radiation whose wavelength is centered between 300 nm and 370 nm. Furthermore, another UV-LED is available, and irradiation can be carried out with radiation of a different UV bandwidth. The actinic radiation source particularly preferable in the present invention is a UV-LED, and a UV-LED having a peak wavelength at 350 to 420 nm is particularly preferable.

The maximum illumination intensity of the LED on a recording medium is preferably 10 to 2,000 mW/cm$^2$, more preferably 20 to 1,000 mW/cm$^2$, and particularly preferably 50 to 800 mW/cm$^2$.

The ink composition of the present invention is desirably exposed to such actinic radiation for, for example, 0.01 to 120 sec., and preferably 0.1 to 90 sec.

Irradiation conditions and a basic method for irradiation with actinic radiation are disclosed in JP-A-60-132767. Specifically, a light source is provided on either side of a head unit that includes an ink composition discharge device, and the head unit and the light source are made to scan by a so-called shuttle system. Irradiation with actinic radiation is carried out after a certain time (e.g. preferably 0.01 to 5 sec., more preferably 0.01 to 3 sec., yet more preferably 0.01 to 1 sec., and especially preferably 0.01 to 0.5 sec.) has elapsed from when the ink has landed. By controlling the time from ink composition landing to irradiation so as to be a minimum in this way, it becomes possible to prevent the ink that has landed on a recording medium from spreading before being cured. Furthermore, since the ink can be exposed before it reaches a deep area of a porous recording medium that the light source cannot reach, it is possible to prevent monomer from remaining unreacted.

Furthermore, curing may be completed using another light source that is not driven. WO99/54415 discloses, as an irradiation method, a method employing an optical fiber and a method in which a collimated light source is incident on a mirror surface provided on a head unit side face, and a recorded area is irradiated with UV light. The inkjet recording method of the present invention may employ these methods.

By employing the above-mentioned inkjet recording method, it is possible to keep the diameter of landed ink composition dots constant even for various recording media having different surface wettability, thus improving the image quality.

The ink composition of the present invention may employ a plurality of colors of ink compositions in combination as an ink set. For example, a cyan ink composition, a magenta ink composition, and a yellow ink composition may be used.

Furthermore, they may be used as an ink set together with black and white ink compositions, or together with light magenta, light cyan, etc. ink compositions. In order to obtain a color image, it is preferable to superimpose in order from low lightness colors. By superimposing in order from low lightness inks, it becomes easy for radiation to reach ink in a lower part, and good curing sensitivity, reduction of residual monomer, and improvement in adhesion can be expected. In terms of irradiation, although it is possible to discharge all the colors and expose them together, it is preferable in terms of promoting curing that exposure is carried out for each color.

In this way, the ink composition of the present invention cures with high sensitivity upon exposure to actinic radiation, thereby forming an image on the surface of a recording medium.

The inkjet recording method of the present invention may suitably employ the ink set comprising the ink composition of the present invention. The order in which colored ink compositions are discharged is not particularly limited, but it is preferable to apply to a recording medium from a colored ink composition having a low lightness; when yellow, cyan, magenta, and black ink compositions are used, they are preferably applied on top of the recording medium in the order yellow→cyan→magenta→black. Moreover, the present invention is not limited thereto, and an ink set comprising a total of seven colors, that is, light cyan, and light magenta ink compositions and cyan, magenta, black, white, and yellow dark ink compositions may preferably be used, and in this case they are applied on top of the recording medium in the order white→light cyan→light magenta→yellow→cyan→magenta→black.

In the present invention, the recording medium is not particularly limited, and a recording medium known as a support or a recording material may be used.

Examples thereof include paper, paper laminated with a plastic (e.g. polyethylene, polypropylene, polystyrene, etc.), a metal plate (e.g. aluminum, zinc, copper, etc.), a plastic film (e.g. cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate, polyvinylacetal, etc.), and paper or plastic film laminated or vapor-deposited with the above metal. In the present invention, as the recording medium, a non-absorbing recording medium may suitably be used.

In accordance with the present invention, there can be provided an ink composition that can give an image having excellent scratch resistance, lightfastness, and saturation, that suppresses odor, and that has excellent storage stability and inkjet discharge properties, and an inkjet recording method employing the ink composition.

EXAMPLES

The present invention is explained in further detail by reference to Examples and Comparative Examples. However, the present invention should not be construed as being limited to these Examples.

'Parts' described below means 'parts by weight' unless otherwise specified.

Materials used in Examples and Comparative Examples were as follows.

PALIOTOL YELLOW D1155 (pigment yellow 185, manufactured by BASF Japan)
PALIOTOL YELLOW D1819 (pigment yellow 139, manufactured by BASF Japan)
NOVOPERM YELLOW PHG (pigment yellow 180, manufactured by Clariant)
SOLSPERSE 32000 (pigment dispersing agent, manufactured by Lubrizol)
Pigment derivative A
Pigment derivative C (compound described in JP-A-2006-348206)
FA-511AS (manufactured by Hitachi Chemical Co., Ltd.)
FA-512AS (manufactured by Hitachi Chemical Co., Ltd.)
SR285 (manufactured by SARTOMER Japan Inc.)
CD611 (manufactured by SARTOMER Japan Inc.)
KAYARAD TC-110S (manufactured by NIPPON KAYAKU Co., Ltd.)
NVC (N-vinylcaprolactam, manufactured by BASF Japan)
NVV (N-vinylvalerolactam, manufactured by BASF Japan)
SR339A (2-phenoxyethyl acrylate, manufactured by Sartomer Japan Inc.)
SR506D (isobornyl acrylate, manufactured by Sartomer Japan Inc.)
SR351S (trimethylolpropane triacrylate, manufactured by Sartomer Japan Inc.)
CN964A85 (urethane acrylate oligomer, average number of functional groups 2, manufactured by Sartomer Japan Inc.)
Lucirin TPO (photoinitiator, manufactured by BASF Japan)
IRGACURE 819 (photoinitiator, manufactured by Ciba Japan)
IRGACURE 369 (photoinitiator, manufactured by Ciba Japan)
FIRSTCURE ITX (isopropylthioxanthone, manufactured by ChemFirst Inc.)
FIRSTCURE ST-1 (polymerization inhibitor, manufactured by ChemFirst Inc.)

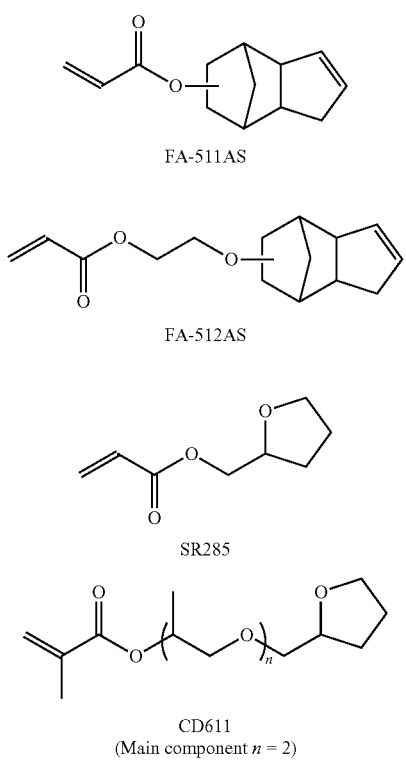

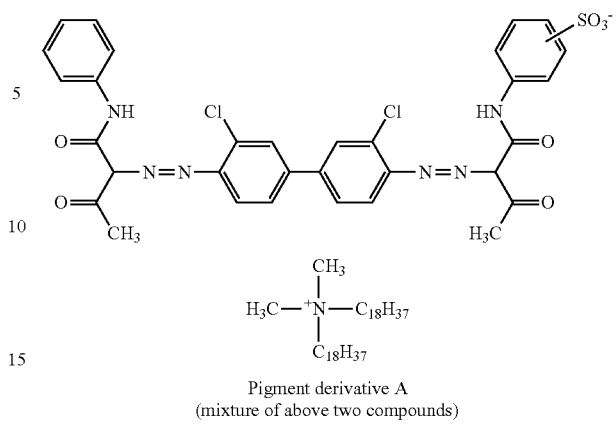

Pigment derivative A
(mixture of above two compounds)

Preparation of Mill Base

Each of yellow mill bases was mixed using the formulations below, and stirred in a mixer (L4R, Silverson) at 2,500 rpm for 10 min. Subsequently, the mixture was placed in a DISPERMAT LS bead mill disperser (VMA) and dispersed using YTZ balls having a diameter of 0.65 mm (Nikkato Corporation) at 2,500 rpm for 6 hours.

| Yellow mill base 1 | |
|---|---|
| PALIOTOL YELLOW D1155 | 20 parts |
| SR339A | 75 parts |
| SOLSPERSE 32000 | 4 parts |
| Pigment derivative A | 1 part |
| Yellow mill base 2 | |
| PALIOTOL YELLOW D1155 | 20 parts |
| SR339A | 75 parts |
| SOLSPERSE 32000 | 4 parts |
| Pigment derivative C | 1 part |
| Yellow mill base 3 | |
| PALIOTOL YELLOW D1155 | 20 parts |
| SR339A | 75 parts |
| SOLSPERSE 32000 | 5 parts |
| Yellow mill base 4 | |
| PALIOTOL YELLOW D1819 | 20 parts |
| SR339A | 75 parts |
| SOLSPERSE 32000 | 4 parts |
| Pigment derivative A | 1 part |
| Comparative yellow mill base 1 | |
| NOVOPERM YELLOW PHG | 20 parts |
| SR339A | 75 parts |
| SOLSPERSE 32000 | 4 parts |
| Pigment derivative A | 1 part |

Example 1

The components below were stirred in a mixer (L4R, Silverson) at 2,500 rpm for 15 min, thus giving yellow radiation curing type ink composition 1.

The viscosity measured using a TVE-22LT (Toki Sangyo Co., Ltd.) at 45° C. was 13.3 mPa·s, and the surface tension measured using a CBVP-Z surface tensiometer (Kyowa Interface Science Co., Ltd.) at 25° C. was 35.3 mN/m.

| | |
|---|---|
| Yellow mill base 1 | 7.0 parts |
| FA-512AS (compound represented by Formula (I)) | 34.0 parts |
| SR285 (compound represented by Formula (II)) | 30.0 parts |
| SR339A | 10.0 parts |
| SR351S | 1.0 parts |
| CN964A85 | 10.0 parts |
| FIRSTCURE ST-1 | 0.1 parts |
| IRGACURE 819 | 2.0 parts |
| IRGACURE 369 | 1.5 parts |
| Lucirin TPO | 3.0 parts |
| FIRSTCURE ITX | 1.4 parts |

Evaluation of Ink Composition

Odor 10 expert panelists carried out a sensory evaluation by smelling the odor of ink composition 1 and evaluating in accordance with the criteria below. The results are shown in Table 1.

Good: 2 or less out of 10 panelists answering that there was unbearably unpleasant odor.

Fair: 3 to 5 out of 10 panelists answering that there was unbearably unpleasant odor.

Poor: 6 or more out of 10 panelists answering that there was unbearably unpleasant odor.

Storage Stability

A glass vial bottle was charged with ink composition 1, and increase in viscosity after storing at 60° C. for 4 weeks was evaluated. The smaller the increase, the better the storage stability, and when it was no greater than 20% there were generally no problems in practice. The results are given in Table 1. Increase (%)=(viscosity after storage−viscosity before storage)/viscosity before storage×100

Cure Rate

The surface of polyvinyl chloride (thickness 220 µm) as a recording medium was coated with ink composition 1 using a K hand coater (bar No. 2) so as to give a wet film thickness of 12 µm. Subsequently, it was radiation-cured by passing it repeatedly through a CSOT UV conveyor (G S Yuasa Power Supply Ltd.) equipped with a MAN250L ozone-free metal halide lamp and set at a conveyor speed of 9.0 m/min and an exposure intensity of 2.0 W/cm$^2$ until tackiness of the coated surface disappeared. The cure rate was evaluated using the criteria below. The results are given in Table 1.

Excellent: became tack-free with 1 pass. The cure rate was very high.

Good: became tack-free with 2 passes. The cure rate was high.

Fair: became tack-free with 3 passes. The cure rate was rather low.

Poor: became tack-free with 4 or more passes or did not cure. The cure rate was low.

Adhesion to Recording Medium

The surface of polyvinyl chloride (thickness 220 µm) as a recording medium was coated with ink composition 1 using a K hand coater (bar No. 2) so as to give a wet film thickness of 12 µm. Subsequently, it was radiation-cured by passing it 12 times repeatedly through a CSOT UV conveyor (G S Yuasa Power Supply Ltd.) equipped with a MAN250L ozone-free metal halide lamp and set at a conveyor speed of 9.0 m/min and an exposure intensity of 2.0 W/cm$^2$. Adhesion to the recording medium was evaluated using this cured film in accordance with ISO 2409 (cross-cut method) using the criteria below. The results are given in Table 1.

0: the cut edge was completely smooth, and there was no peeling anywhere in any lattice cell.

1: slight peeling of coated film at the intersection point of cuts. The cross-cut portion affected did not exceed 5%.

2: peeled along the edge of a cut and/or the intersection point of cuts in the coated film. The cross-cut portion affected was greater than 5% but did not exceed 15%.

3: large amount of peeling along the edge of cuts of the coated film in parts or in the whole area and/or various parts of the lattice cell were partially or completely peeled. The cross-cut portion affected was greater than 15% but did not exceed 35%.

4: large amount of peeling along the edge of cuts of the coated film in parts or in the whole area and/or lattice cells of several areas were partially or completely peeled. The cross-cut portion affected was greater than 35% but did not exceed 65%.

5: the degree of peeling was beyond that in 4.

If in the range of criteria 0 to 3, there is no problem in practice.

Flexibility

The surface of polyvinyl chloride (thickness 220 µm) as a recording medium was coated with ink composition 1 using a K hand coater (bar No. 2) so as to give a wet film thickness of 12 µm. Subsequently, it was radiation-cured by passing it 12 times repeatedly through a CSOT UV conveyor (G S Yuasa Power Supply Ltd.) equipped with a MAN250L ozone-free metal halide lamp and set at a conveyor speed of 9.0 m/min and an exposure intensity of 2.0 W/cm$^2$. Flexibility was evaluated by bending this cured film five times to and fro at the same location, and the degree of cracking occurring in the coated film was then evaluated using the criteria below. The results are given in Table 1.

Excellent: no cracking at all. Flexibility was very high.

Good: slight cracking. Flexibility was high.

Fair: rather large cracks. Flexibility was rather low.

Poor: completely cracked. Flexibility was low.

Scratch Resistance

The surface of polyvinyl chloride (thickness 220 µm) as a recording medium was coated with ink composition 1 using a K hand coater (bar No. 2) so as to give a wet film thickness of 12 µm. Subsequently, it was radiation-cured by passing it 12 times repeatedly through a CSOT UV conveyor (G S Yuasa Power Supply Ltd.) equipped with a MAN250L ozone-free metal halide lamp and set at a conveyor speed of 9.0 m/min and an exposure intensity of 2.0 W/cm$^2$. Scratch resistance was evaluated using this cured film in accordance with ISO 15184 (pencil scratch test) using the criteria below. The results are given in Table 1.

Excellent: 4H or higher, scratch resistance was very good.

Good: at least F but no greater than 3H, scratch resistance was good.

Fair: at least 3B but no greater than HB, scratch resistance was rather poor.

Poor: no greater than 4B, scratch resistance was poor.

Saturation

The surface of polyvinyl chloride (thickness 220 µm) as a recording medium was coated with ink composition 1 using a K hand coater (bar No. 2) so as to give a wet film thickness of 12 µm. Subsequently, it was radiation-cured by passing it 12 times repeatedly through a CSOT UV conveyor (G S Yuasa Power Supply Ltd.) equipped with a MAN250L ozone-free metal halide lamp and set at a conveyor speed of 9.0 m/min and an exposure intensity of 2.0 W/cm$^2$. This cured coating was subjected to measurement of saturation ($C^*=\sqrt{(a^{*2}+b^{*2})}$) of the yellow color using a Spectrolino manufactured by Gretag Macbeth under conditions of a D50 measurement light source, a viewing angle of 2°, and color density standard ANSI Status T. The results are shown in Table 1.

Inkjet Discharge Properties

Evaluation was made using the criteria below by continuously discharging ink composition 1 at 45° C. for 60 min from a JetLyzer (Mimaki Engineering Co., Ltd.) equipped with a CA3 inkjet print head (Toshiba Tec Corporation) and set at a discharge voltage of 22 V and a discharge drop number of 7 drops. The results are given in Table 1.

Excellent: droplet firing was carried out normally. Inkjet discharge properties were very good.

Good: a slight degree of mist generation was observed. Inkjet discharge properties were good.

Fair: mist generation was observed. Inkjet discharge properties were rather poor.

Poor: no discharge at all. Inkjet discharge properties were poor.

Image Quality (Contact Angle)

The surface of polyvinyl chloride (thickness 220 μm) as a recording medium was coated with ink composition 1 using a K hand coater (bar No. 2) so as to give a wet film thickness of 12 μm. Subsequently, it was radiation-cured by passing it 12 times repeatedly through a CSOT UV conveyor (G S Yuasa Power Supply Ltd.) equipped with a MAN250L ozone-free metal halide lamp and set at a conveyor speed of 9.0 m/min and an exposure intensity of 2.0 W/cm$^2$. 2 μL of ink composition 1 was dropped on this cured film, and the contact angle after 1.2 sec was measured using a DropMaster DM700 mechanical surface analyzer (Kyowa Interface Science Co., Ltd.). The larger the contact angle, the more uneven the image and the poorer the image quality. The results are given in Table 1.

Image Quality (Visual)

An ink cartridge charged with ink composition 1 was loaded in a UV250GT Luxel Jet UV inkjet printer manufactured by Fujifilm Corporation, and a 100% solid image was drawn in quality mode on LLJET Banner series Ultragloss manufactured by Sakurai Co., Ltd. as a substrate. The glossiness of the image was evaluated using the criteria below. The results are shown in Table 1.

Excellent: Image was very smooth and had high glossiness. Image quality was very good.

Good: Image was smooth and had glossiness. Image quality was good.

Fair: Image was slightly rough and had hardly any glossiness. Image quality was slightly poor.

Poor: Image was rough and had no glossiness. Image quality was poor.

Lightfastness

An ink cartridge charged with ink composition 1 was loaded in a UV250GT Luxel Jet UV inkjet printer manufactured by Fujifilm Corporation, and a halftone image was drawn in quality mode on LLJET Banner series Ultragloss manufactured by Sakurai Co., Ltd. as a substrate. A test piece for which the yellow density was 1.0 was irradiated with light using a model Ci4000 xenon lightfastness tester (Xenon Weather-Ometer) manufactured by ATLAS under conditions of a black panel temperature of 40° C., a test chamber temperature of 25° C., and a relative humidity of 50% for 50 days. The difference in color before and after irradiation with light was evaluated using the criteria below. The results are shown in Table 1.

Excellent: There was hardly any fading in color.

Good: There was slight fading in color.

Fair: There was fading in color.

Poor: There was marked fading in color.

Examples 2 to 4 and Comparative Example 1

Ink compositions were prepared in the same manner as for ink composition 1 except that yellow mill base 1 in ink composition 1 was changed to mill bases 2 to 4 and comparative yellow mill base 1, and evaluation was carried out in the same manner as in Example 1. The results are shown in Table 1.

Examples 5 to 19

Ink compositions of Examples 5 to 19 were prepared in the same manner as for ink composition of Example 1 except that the components of ink composition 1 were changed as described in Table 2, and evaluation was carried out as in Example 1. The results are given in Table 2.

Examples 20 to 24, and Comparative Example 2

Ink compositions of Examples 20 to 24, and Comparative Example 2 were prepared in the same manner as for ink composition of Example 1 except that the components of ink composition 1 were changed as described in Table 3, and evaluation was carried out as in Example 1. The results are given in Table 3.

TABLE 1

|  | Example | | | | Comparative Example |
|---|---|---|---|---|---|
|  | 1 | 2 | 3 | 4 | 1 |
| Yellow mill base 1 | 7.0 | — | — | — | — |
| Yellow mill base 2 | — | 7.0 | — | — | — |
| Yellow mill base 3 | — | — | 7.0 | — | — |
| Yellow mill base 4 | — | — | — | 7.0 | — |
| Comparative yellow mill base 1 | — | — | — | — | 7.0 |
| FA-512AS (compound represented by Formula (I)) | 34.0 | 34.0 | 34.0 | 34.0 | 34.0 |
| SR285 (compound represented by Formula (II)) | 30.0 | 30.0 | 30.0 | 30.0 | 29.0 |
| SR339A | 10.0 | 10.0 | 10.0 | 10.0 | 11.0 |
| SR351S | 1.0 | 1.0 | 1.0 | 1.0 | 1.0 |
| CN964A85 | 10.0 | 10.0 | 10.0 | 10.0 | 10.0 |
| FIRSTCURE ST-1 | 0.1 | 0.1 | 0.1 | 0.1 | 0.1 |
| IRGACURE 819 | 2.0 | 2.0 | 2.0 | 2.0 | 2.0 |
| IRGACURE 369 | 1.5 | 1.5 | 1.5 | 1.5 | 1.5 |
| Lucirin TPO | 3.0 | 3.0 | 3.0 | 3.0 | 3.0 |
| FIRSTCURE ITX | 1.4 | 1.4 | 1.4 | 1.4 | 1.4 |
| Odor | Good | Good | Good | Good | Good |
| Storage stability (%) | 4 | 14 | 19 | 6 | 6 |

TABLE 1-continued

|  | Example | | | | Comparative Example |
|---|---|---|---|---|---|
|  | 1 | 2 | 3 | 4 | 1 |
| Cure rate | Excellent | Excellent | Excellent | Excellent | Excellent |
| Adhesion to recording medium | 0 | 0 | 0 | 0 | 0 |
| Flexibility | Excellent | Excellent | Excellent | Excellent | Excellent |
| Scratch resistance | Excellent | Excellent | Excellent | Excellent | Excellent |
| Saturation | 101 | 101 | 101 | 98 | 97 |
| Inkjet discharge properties | Excellent | Good | Fair | Excellent | Excellent |
| Image quality (contact angle) (°) | 24 | 28 | 25 | 25 | 24 |
| Image quality (visual) | Excellent | Excellent | Excellent | Excellent | Excellent |
| Lightfastness | Excellent | Excellent | Excellent | Good | Poor |

TABLE 2

|  | Example | | | | | | | |
|---|---|---|---|---|---|---|---|---|
|  | 5 | 6 | 7 | 8 | 9 | 10 | 11 | 12 |
| Yellow mill base 1 | 7.0 | 7.0 | 7.0 | 7.0 | 7.0 | 7.0 | 7.0 | 7.0 |
| Compound represented by Formula (I) | | | | | | | | |
| FA-512AS | 1.0 | 6.0 | 11.0 | 16.0 | 26.0 | 34.0 | 39.0 | 41.0 |
| FA-511AS | — | — | — | — | — | — | — | — |
| Compound represented by Formula (II) | | | | | | | | |
| SR285 | 5.0 | 10.0 | 15.0 | 20.0 | 30.0 | 40.0 | 45.0 | 45.0 |
| CD611 | — | — | — | — | — | — | — | — |
| KAYARAD TC-110S | — | — | — | — | — | — | — | — |
| Compound represented by Formula (III) | | | | | | | | |
| NVC | — | — | — | — | — | — | — | — |
| NVV | — | — | — | — | — | — | — | — |
| SR339A | 68.0 | 58.0 | 48.0 | 38.0 | 18.0 | — | — | — |
| SR351S | 1.0 | 1.0 | 1.0 | 1.0 | 1.0 | 1.0 | 1.0 | — |
| SR506D | — | — | — | — | — | — | — | — |
| CN964A85 | 10.0 | 10.0 | 10.0 | 10.0 | 10.0 | 10.0 | — | — |
| FIRSTCURE ST-1 | 0.1 | 0.1 | 0.1 | 0.1 | 0.1 | 0.1 | 0.1 | 0.1 |
| IRGACURE 819 | 2.0 | 2.0 | 2.0 | 2.0 | 2.0 | 2.0 | 2.0 | 2.0 |
| IRGACURE 369 | 1.5 | 1.5 | 1.5 | 1.5 | 1.5 | 1.5 | 1.5 | 1.5 |
| Lucirin TPO | 3.0 | 3.0 | 3.0 | 3.0 | 3.0 | 3.0 | 3.0 | 3.0 |
| FIRSTCURE ITX | 1.4 | 1.4 | 1.4 | 1.4 | 1.4 | 1.4 | 1.4 | 1.4 |
| Odor | Good | Good | Good | Good | Good | Good | Good | Good |
| Storage stability (%) | 4 | 4 | 4 | 5 | 5 | 6 | 8 | 9 |
| Cure rate | Fair | Fair | Good | Excellent | Excellent | Excellent | Good | Good |
| Adhesion to recording medium | 3 | 2 | 1 | 0 | 0 | 0 | 0 | 0 |
| Flexibility | Excellent | Excellent | Excellent | Excellent | Excellent | Excellent | Excellent | Excellent |
| Scratch resistance | Fair | Fair | Good | Excellent | Excellent | Excellent | Good | Fair |
| Saturation | 101 | 101 | 101 | 101 | 101 | 101 | 101 | 101 |
| Inkjet discharge properties | Excellent | Excellent | Excellent | Excellent | Excellent | Good | Good | Fair |
| Image quality (contact angle) (°) | 22 | 22 | 22 | 25 | 25 | 25 | 26 | 27 |
| Image quality (visual) | Excellent | Excellent | Excellent | Excellent | Excellent | Excellent | Excellent | Excellent |
| Lightfastness | Excellent | Excellent | Excellent | Excellent | Excellent | Excellent | Excellent | Excellent |

|  | Example | | | | | | |
|---|---|---|---|---|---|---|---|
|  | 13 | 14 | 15 | 16 | 17 | 18 | 19 |
| Yellow mill base 1 | 7.0 | 7.0 | 7.0 | 7.0 | 7.0 | 7.0 | 7.0 |
| Compound represented by Formula (I) | | | | | | | |
| FA-512AS | — | 26.0 | 26.0 | 26.0 | 26.0 | 26.0 | 26.0 |
| FA-511AS | 26.0 | — | — | — | — | — | — |
| Compound represented by Formula (II) | | | | | | | |
| SR285 | 30.0 | — | — | — | — | — | 15.0 |
| CD611 | — | 30.0 | — | — | — | — | — |
| KAYARAD TC-110S | — | — | 30.0 | — | — | — | — |
| Compound represented by Formula (III) | | | | | | | |
| NVC | — | — | — | 30.0 | — | 15.0 | 15.0 |
| NVV | — | — | — | — | 30.0 | 15.0 | — |
| SR339A | 18.0 | 18.0 | 18.0 | 18.0 | 18.0 | 18.0 | 18.0 |
| SR351S | 1.0 | 1.0 | 1.0 | 1.0 | 1.0 | 1.0 | 1.0 |
| SR506D | — | — | — | — | — | — | — |

TABLE 2-continued

|  | | | | | | | |
|---|---|---|---|---|---|---|---|
| CN964A85 | 10.0 | 10.0 | 10.0 | 10.0 | 10.0 | 10.0 | 10.0 |
| FIRSTCURE ST-1 | 0.1 | 0.1 | 0.1 | 0.1 | 0.1 | 0.1 | 0.1 |
| IRGACURE 819 | 2.0 | 2.0 | 2.0 | 2.0 | 2.0 | 2.0 | 2.0 |
| IRGACURE 369 | 1.5 | 1.5 | 1.5 | 1.5 | 1.5 | 1.5 | 1.5 |
| Lucirin TPO | 3.0 | 3.0 | 3.0 | 3.0 | 3.0 | 3.0 | 3.0 |
| FIRSTCURE ITX | 1.4 | 1.4 | 1.4 | 1.4 | 1.4 | 1.4 | 1.4 |
| Odor | Fair | Good | Good | Good | Good | Good | Good |
| Storage stability (%) | 8 | 5 | 4 | 15 | 14 | 15 | 12 |
| Cure rate | Excellent | Good | Good | Good | Good | Good | Good |
| Adhesion to recording medium | 0 | 3 | 3 | 0 | 0 | 0 | 0 |
| Flexibility | Excellent | Excellent | Excellent | Excellent | Excellent | Excellent | Excellent |
| Scratch resistance | Excellent | Good | Good | Fair | Fair | Fair | Good |
| Saturation | 101 | 101 | 101 | 101 | 101 | 101 | 101 |
| Inkjet discharge properties | Excellent | Excellent | Excellent | Good | Good | Good | Good |
| Image quality (contact angle) (°) | 23 | 25 | 26 | 35 | 33 | 34 | 29 |
| Image quality (visual) | Excellent | Excellent | Excellent | Fair | Fair | Fair | Good |
| Lightfastness | Excellent | Excellent | Excellent | Excellent | Excellent | Excellent | Excellent |

TABLE 3

|  | Example | | | | | Comparative Example |
|---|---|---|---|---|---|---|
|  | 20 | 21 | 22 | 23 | 24 | 2 |
| Yellow mill base 1 | 7.0 | 7.0 | 7.0 | 7.0 | 7.0 | — |
| FA-512AS (Compound represented by Formula (I)) | — | — | 56.0 | — | — | — |
| SR285 (Compound represented by Formula (II)) | 30.0 | 15.0 | — | 56.0 | — | — |
| NVC (Compound represented by Formula (III)) | 26.0 | 15.0 | — | — | 56.0 | — |
| SR339A | 18.0 | 18.0 | 38.0 | 38.0 | 38.0 | 38.0 |
| SR351S | 1.0 | 1.0 | 1.0 | 1.0 | 1.0 | 1.0 |
| SR506D | — | 26.0 | — | — | — | 56.0 |
| CN964A85 | 10.0 | 10.0 | 10.0 | 10.0 | 10.0 | 10.0 |
| FIRSTCURE ST-1 | 0.1 | 0.1 | 0.1 | 0.1 | 0.1 | 0.1 |
| IRGACURE 819 | 2.0 | 2.0 | 2.0 | 2.0 | 2.0 | 2.0 |
| IRGACURE 369 | 1.5 | 1.5 | 1.5 | 1.5 | 1.5 | 1.5 |
| Lucirin TPO | 3.0 | 3.0 | 3.0 | 3.0 | 3.0 | 3.0 |
| FIRSTCURE ITX | 1.4 | 1.4 | 1.4 | 1.4 | 1.4 | 1.4 |
| Odor | Good | Fair | Good | Good | Good | Poor |
| Storage stability (%) | 14 | 11 | 6 | 4 | 19 | 6 |
| Cure rate | Fair | Good | Excellent | Fair | Good | Fair |
| Adhesion to recording medium | 0 | 0 | 3 | 0 | 0 | 5 |
| Flexibility | Excellent | Excellent | Good | Excellent | Excellent | Excellent |
| Scratch resistance | Fair | Fair | Excellent | Fair | Fair | Poor |
| Saturation | 101 | 101 | 101 | 101 | 101 | 101 |
| Inkjet discharge properties | Good | Good | Fair | Excellent | Fair | Excellent |
| Image quality (contact angle) (°) | 32 | 30 | 22 | 22 | 38 | 24 |
| Image quality (visual) | Fair | Good | Excellent | Excellent | Fair | Excellent |
| Lightfastness | Excellent | Excellent | Excellent | Excellent | Excellent | Excellent |

The invention claimed is:

1. An ink composition comprising:
   (A) an isoindoline-based pigment;
   (B) a pigment dispersing agent;
   (C) a radically polymerizable compound; and
   (D) a polymerization initiator;
   the radically polymerizable compound (C) comprising a difunctional urethane (meth)acrylate oligomer and at least one compound selected from the group consisting of compounds represented by Formula (I) to Formula (III): and a difunctional urethane (meth)acrylate oligomer:

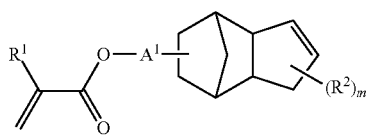
(I)

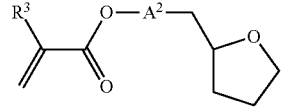
(II)

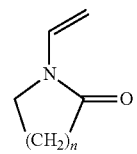
(III)

wherein
R$^1$ denotes a hydrogen atom or a methyl group,
A$^1$ denotes a single bond or a divalent linking group,
R$^2$ denotes a monovalent substituent,
m denotes an integer of 0 to 13, and when m is an integer of 2 to 13, the R$^2$s may be identical to or different from each other,
R$^3$ denotes a hydrogen atom or a methyl group, $A^2$ denotes a single bond or a divalent linking group, and n denotes an integer of 1 to 5.

2. The ink composition according to claim 1, wherein the total content of compounds represented by Formula (I), Formula (II), and Formula (III) is at least 15 wt % but no greater than 85 wt % of the ink composition.

3. The ink composition according to claim 1 which comprises a compound represented by Formula (I).

4. The ink composition according to claim 1 which comprises a compound represented by Formula (I) and at least one compound selected from the group consisting of compounds represented by Formula (II) and Formula (III).

5. The ink composition according to claim 1, wherein the isoindoline-based pigment (A) is C.I. Pigment Yellow 185.

6. The ink composition according to claim 1, wherein the pigment dispersing agent (B) comprises a sulfonic acid derivative of a disazo pigment.

7. The ink composition according to claim 6, wherein the sulfonic acid derivative of a disazo pigment is a compound represented by Formula (1):

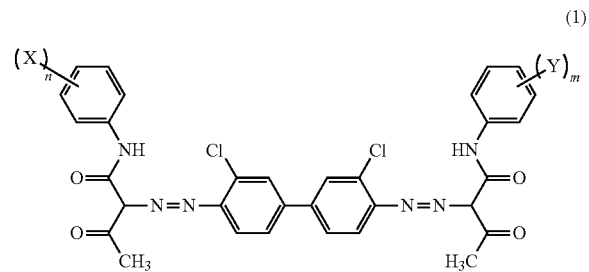

wherein
X and Y independently denote a group represented by Formula (2), and m and n each satisfy $0.2 < m+n \leq 1.5$ and denote a number of 0 or greater,

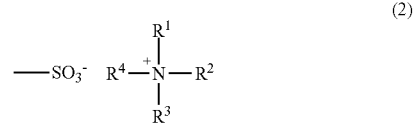

wherein
$R^1$ to $R^4$ independently denote a hydrogen atom or an alkyl group having 1 to 30 carbon atoms, and at least one of $R^1$ to $R^4$ is an alkyl group having 1 to 30 carbon atoms.

8. The ink composition according to claim 6, wherein the sulfonic acid derivative of a disazo pigment has a content of at least 0.1 wt % but no greater than 100 wt % relative to the total weight of the isoindoline-based pigment (A).

9. The ink composition according to claim 1, wherein the radically polymerizable compound (C) comprises a monofunctional (meth)acrylic acid ester having an aryl group having 6 to 20 carbon atoms.

10. The ink composition according to claim 1, wherein the radically polymerizable compound (C) comprises a 3- to 6-functional (meth)acrylic acid ester compound.

11. The ink composition according to claim 1, wherein the polymerization initiator (D) comprises an acylphosphine compound.

12. An inkjet recording method comprising:
($a^1$) a step of discharging an ink composition onto a recording medium; and
($b^1$) a step of curing the ink composition by irradiating the discharged ink composition with actinic radiation,
the ink composition being the ink composition according to claim 1.

* * * * *